US011900756B2

(12) United States Patent
Bhutani et al.

(10) Patent No.: US 11,900,756 B2
(45) Date of Patent: Feb. 13, 2024

(54) PRODUCT RELEASE MECHANISMS AND VENDING MACHINES HAVING PRODUCT RELEASE MECHANISMS

(71) Applicant: PepsiCo, Inc., Purchase, NY (US)

(72) Inventors: Gurmeet Singh Bhutani, Gurgaon (IN); Sandeep Jain, Gurgaon (IN)

(73) Assignee: PepsiCo, Inc., Purchase, NY (US)

( * ) Notice: Subject to any disclaimer, the term of this patent is extended or adjusted under 35 U.S.C. 154(b) by 30 days.

(21) Appl. No.: 17/580,319

(22) Filed: Jan. 20, 2022

(65) Prior Publication Data

US 2022/0245985 A1 Aug. 4, 2022

(30) Foreign Application Priority Data

Feb. 2, 2021 (IN) ............................ 202141004392

(51) Int. Cl.
*G07F 11/58* (2006.01)
*G07F 17/00* (2006.01)

(52) U.S. Cl.
CPC .......... *G07F 11/58* (2013.01); *G07F 17/0014* (2013.01)

(58) Field of Classification Search
CPC ........................................................ G07F 11/58
See application file for complete search history.

(56) References Cited

U.S. PATENT DOCUMENTS

| | | | | |
|---|---|---|---|---|
| 2,376,561 | A | 5/1945 | Smith | |
| 3,390,754 | A | 7/1968 | Newberry | |
| 6,253,954 | B1 | 7/2001 | Yasaka | |
| 6,415,953 | B1 * | 7/2002 | O'Brien | G07F 11/32 221/196 |
| 6,513,677 | B1 | 2/2003 | Sorensen et al. | |
| 6,543,639 | B1 * | 4/2003 | Kovens | G07F 11/22 221/217 |
| 8,087,541 | B2 | 1/2012 | Valota et al. | |
| 2001/0000609 | A1 | 5/2001 | Rudick et al. | |
| 2004/0056042 | A1 | 3/2004 | Skavnak | |
| 2005/0252925 | A1 | 11/2005 | Kelly | |

(Continued)

FOREIGN PATENT DOCUMENTS

CN 106340125 A 1/2017

OTHER PUBLICATIONS

International Search Report and Written Opinion of the International Searching Authority in International Application No. PCT/US2022/013154, dated Jun. 2, 2022 (17 pages).

*Primary Examiner* — Gene O Crawford
*Assistant Examiner* — Ayodeji T Ojofeitimi
(74) *Attorney, Agent, or Firm* — Sterne, Kessler, Goldstein & Fox P.L.L.C.

(57) ABSTRACT

A vending machine includes a housing defining a product compartment and a front wall having a transparent portion. A platform is arranged within the product compartment of the vending machine for storing a product thereon, and the platform includes a first end opposite a second end. The vending machine further includes a product release mechanism that includes a gate arranged on the platform and movable from a closed position to an open position to release the product from the platform. A delivery bin having an open front end is arranged below the platform such that when the first gate is moved to the open position, the product falls under a force of gravity from the platform into the delivery bin for access by a consumer.

19 Claims, 30 Drawing Sheets

(56) References Cited

U.S. PATENT DOCUMENTS

| | | | | |
|---|---|---|---|---|
| 2007/0084875 | A1* | 4/2007 | Percy | G07F 11/16<br>221/258 |
| 2011/0127288 | A1 | 6/2011 | Valota | |
| 2011/0147402 | A1* | 6/2011 | Valota | G07F 11/58<br>221/1 |
| 2014/0339251 | A1* | 11/2014 | Crothers | G07F 9/105<br>221/150 R |
| 2014/0367403 | A1 | 12/2014 | Carpentier et al. | |

* cited by examiner

PRODUCT RELEASE MECHANISMS AND VENDING MACHINES HAVING PRODUCT RELEASE MECHANISMS

FIELD

Embodiments described herein relate to product release mechanisms for vending machines. Specifically, embodiments described herein relate to product release mechanisms that include one or more gates for controlling release of a product and a delivery bin for receiving the product and providing a consumer with access to the product.

BACKGROUND

Vending machines are often used to dispense products to consumers in an unattended manner. Products are stored in a product compartment of the vending machine and are released to a dispensing area for access by the consumer. Various mechanisms exist for releasing products from the product compartment and for transporting the product to the dispensing area. It is important for the vending machine to consistently and reliably release and dispense products to consumers so that the consumers receive the purchased product. As the vending machine is unattended, the consumer may have no recourse in the event the consumer does not receive the product.

SUMMARY OF THE INVENTION

Some embodiments described herein relate to a vending machine that includes a housing defining a product compartment, wherein the housing includes a front wall having a transparent portion, and a product release mechanism. The product release mechanism includes a platform arranged within the product compartment for storing a product, wherein the platform includes a first end opposite a second end, and a gate arranged on the platform that is movable from a closed position to an open position to release the product from the platform. The vending machine further includes a delivery bin having an open front end, wherein the delivery bin is arranged at the first end of the platform such that when the first gate is moved to the open position, the product falls under a force of gravity from the platform into the delivery bin for access by a consumer through the open front end.

In any of the various embodiments described herein, the vending machine may further include a gate control mechanism configured to selectively control movement of the gate from the closed position to the open position. In some embodiments, the gate control mechanism may include a rack engaged with a pinion of the gate.

In any of the various embodiments described herein, the vending machine may further include a second product release mechanism arranged within the product compartment for storing a second product, wherein the second product release mechanism is arranged at a different elevation than the first product release mechanism, and a second delivery bin arranged at a different elevation than the delivery bin, wherein the second delivery bin is configured to receive a product released from the second product release mechanism.

In any of the various embodiments described herein, the product may be a beverage container, and wherein the platform may be configured to support the beverage container in an upright orientation.

In any of the various embodiments described herein, the platform may be arranged at an incline such that the product moves from the second end of the platform toward the first end of the platform under a force of gravity.

In any of the various embodiments described herein, the vending machine may further include an advancing mechanism configured to automatically advance products toward the first end of the platform.

In any of the various embodiments described herein, the platform may be one of a plurality of platforms arranged at different elevations within the product compartment, and the delivery bin may be one of a plurality of delivery bins.

In any of the various embodiments described herein, the delivery bin may include a flap that movably covers the open front end of the delivery bin.

In any of the various embodiments described herein, the delivery bin may include a drawer that is movable from a closed position to an open position such that a product within the drawer is accessible to a consumer in the open position.

Some embodiments described herein relate to a vending machine that includes a housing defining a product compartment, wherein the housing includes a front wall having a transparent portion, and a platform arranged within the product compartment for storing a product, wherein the platform comprises a first end opposite a second end. The vending machine further includes a product release mechanism configured to selectively release the product from the platform, a delivery bin arranged below the platform such that when the product release mechanism is operated, the product falls from the platform into the delivery bin for access by a consumer, and a buffering mechanism configured to control the fall of the product from the platform into the delivery bin.

In any of the various embodiments described herein, the product release mechanism may include a gate and a gate control mechanism configured to move the gate from a closed position to an open position.

In any of the various embodiments described herein, the buffering mechanism may include a guide channel extending from an upper end of the product compartment toward a lower end of the product compartment, wherein the delivery bin may be arranged below the platform.

In any of the various embodiments described herein, the buffering mechanism may include a cushion.

In any of the various embodiments described herein, the buffering mechanism may include a plurality of bristles extending transverse to a longitudinal axis of the housing.

In any of the various embodiments described herein, the buffering mechanism may include one or more pads arranged on the front wall of the housing or on the first end of the platform.

Some embodiments described herein relate to a product release mechanism for a vending machine that includes a platform having a first end opposite a second end and configured to support a first product and a second product, a first gate arranged at the first end of the platform and movable from a closed position in which the first product is not accessible to a consumer to an open position in which the first product is accessible to a consumer, a second gate arranged on the platform and spaced from the first gate and movable from a closed position to an open position, and a gate control mechanism configured to control the first gate and the second gate, such that the first gate is arranged in the open position and the second gate is moved to the closed position to provide a consumer with access to the first product on the platform while preventing access to the second product on the platform.

In any of the various embodiments described herein, the product release mechanism may further include an advancing assembly configured to automatically advance the first product and the second product toward the first end of the platform.

In any of the various embodiments described herein, the product release mechanism may further include a third gate spaced from the second gate and configured to control an advance of products on the platform toward the first end of the platform.

In any of the various embodiments described herein, the product release mechanism may further include a gate control mechanism configured to control opening and closing of the first gate and the second gate.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
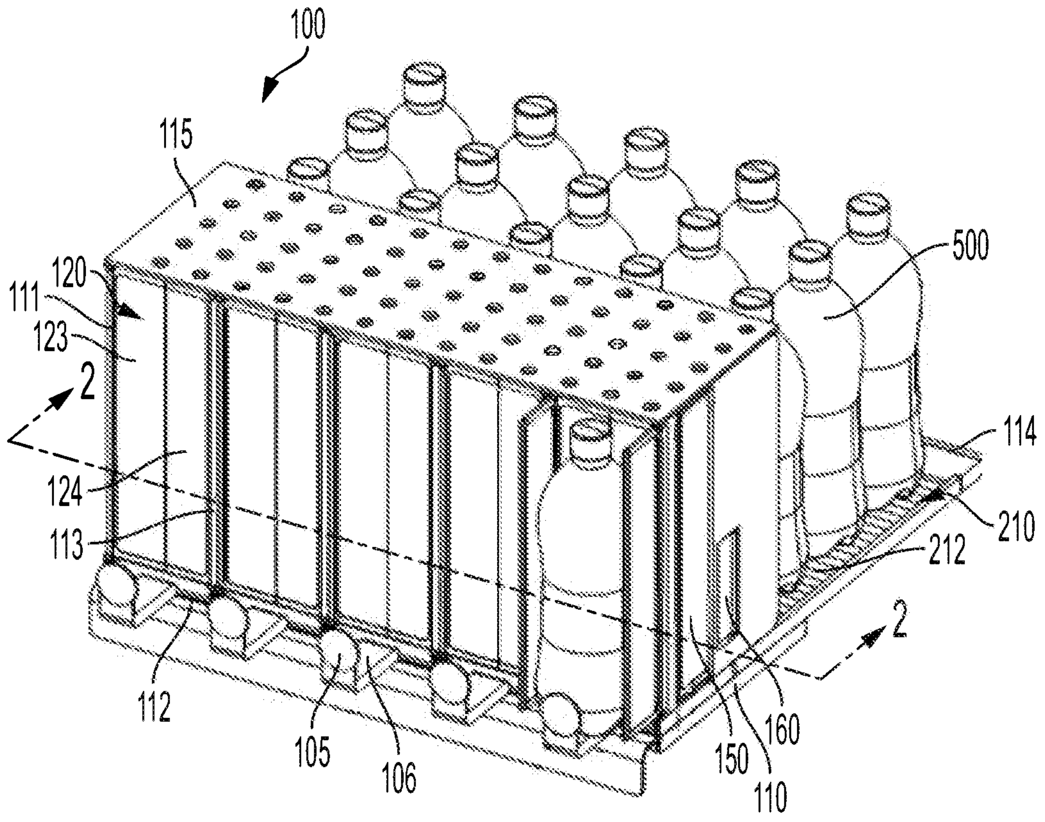
FIG. 1 shows a perspective view of product release mechanisms according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Vending machines may include a product release mechanisms for releasing a product from a product storage area. When a consumer selects a product, such as by a user interface, the product release mechanism may release a product from the product storage area to be dispensed to a consumer. If the product release mechanism fails to function properly, the consumer's product may not be dispensed. As a result the consumer may have a negative experience and may not use the vending machine again in the future. If the release mechanisms releases more than the purchased number of products, the vending machine operator may lose money. Further, a malfunctioning product release mechanism may require repair, preventing the vending machine from being used until the repair is completed.

Some vending machines may provide consumers with access to the product compartment so that the consumers may hand select a product. However, it may be desirable to limit the consumer's access to products within the storage compartment to prevent theft or tampering. In such vending machines, it may be desirable to provide a product release mechanism that allows for access to a single product while limiting access to additional products.

In vending machines having closed doors, and thus that are not accessible by consumers, the vending machine may allow a product to simply fall from a shelf under the force of gravity to a dispensing bin or portal. However, dropping a product under the force of gravity may result in damage to products, such as fragile or breakable products, such as chips or crackers, or may result in an increase in pressure in carbonated beverages. As a result, the carbonated beverage may overflow when opened or the consumer may have to wait to consume the beverage to allow the pressure to dissipate, which can be undesirable. Accordingly, mechanisms for controlling a drop of the product in a vending machine are desired.

Some vending machines may include separate delivery mechanisms for conveying the product released from the shelf to a delivery bin or portal. Delivery mechanisms may add expense to the capital costs of manufacturing the vending machine, and may provide another source of potential malfunction. Thus, it is desired to provide a delivery mechanism that is simple and that may reliably convey a product to a delivery bin or portal.

Some embodiments described herein relate to a product release mechanism for a vending machine that includes a first gate for releasing a product from a platform and a second gate for preventing access to additional products on the platform in order to provide a consumer with access to a purchased product while limiting the consumer's access the additional products on the platform. Some embodiments described herein relate to delivery mechanisms for conveying products to a delivery bin or portal in a simple and reliable manner. Some embodiments described herein relate to buffering mechanisms for vending machines that may control the gravitational drop of a product released from a shelf or platform in order to prevent or minimize damage to the dispensed product.

As used herein, the term "product" may refer to any of various items, including but not limited to snacks, such as bags or boxes of chips, pretzels, crackers, cookies, granola bars, energy bars; packaged beverages such as beverages contained in bottles, cans, cartons, or pouches, such as water, sparkling water, carbonated soft drinks, energy drinks, coffee- or tea-based beverages, dairy-based beverages, or sports drinks, among others; and retail merchandise, such as small electronics, among others.

Product release mechanisms as described herein may be used in vending machines that provide consumers with direct access to the product compartment, such as for hand selecting a product, which may be referred to as "open door vending machines." Product release mechanisms described herein may also be incorporated into vending machines that do not provide consumers with direct access to the product compartment, which may be referred to as "closed door vending machines."

Some embodiments described herein relate to a product release mechanism 100 for a vending machine. As shown in FIG. 1, each row of products may include a product release mechanism 100 for controlling release of products in that row. Each product release mechanism 100 may include a platform 110 having a first end 112 opposite a second end 114. In some embodiments, a plurality of product release mechanisms 100 may be arranged in a side-by-side manner so as to form a shelf. Products 500 may be arranged in a single row from first end 112 to second end 114 of platform 110. For example, products 500 may be beverage containers arranged in an upright orientation in a single row. Platform 110 may include a rail 111, 113 on each side of platform 110 that extends from first end 112 to or toward second end 114 of platform 110. Rails 111, 113 may help to maintain products in a row on platform 110 and gates of product release mechanism may be secured to a rail 111, 113 as discussed herein.

Products may be automatically advanced toward first end 112 of platform 110, such as by gravity or by an advancing mechanism 210. In this way, once a product is removed from first end 112 of platform 110, the remaining products may be automatically advanced toward first end 112 of platform 110 by gravity or by advancing mechanism 210. For example, platform 110 may be arranged at an angle relative to a horizontal plane, such that second end 114 is arranged at a greater elevation than first end 112 of platform 110 so that products advance from second end 114 toward first end 112 under the force of gravity. In such embodiments, as shown in FIG. 1, platform 110 may include an advancing mechanism 210 formed as rollers 212 or bearings to facilitate movement of products toward first end 112 under the force of gravity. In some embodiments, a pusher, such as pusher 220 may be arranged at second end 114 of platform 110 and may be biased toward first end 112 (see, e.g., FIG. 18). When a product is removed, the pusher may automatically move the remaining products toward first end 112. The pusher may be spring-biased, driven by a motor, or the like. In another example, platform 110 may include a conveyor assembly for automatically advancing products toward first end 112. Various advancing mechanisms are known as will be appreciated by one of ordinary skill in the art.

Figure 2B:
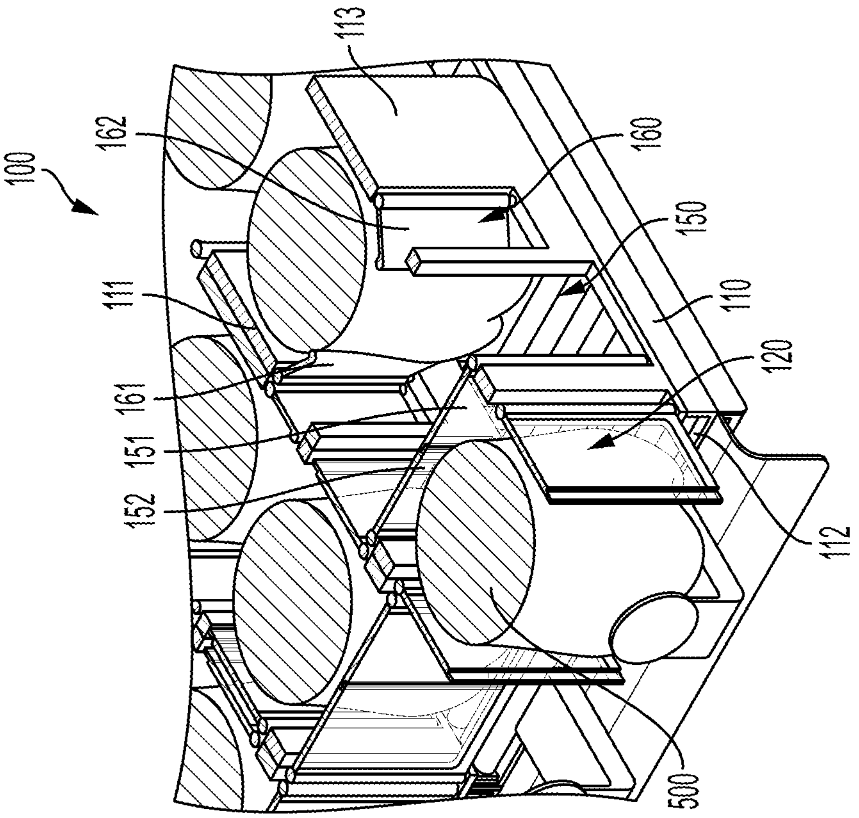
FIGS. 2A and 2B show perspective cross-sectional views of the product release mechanisms of FIG. 1 as taken along line 2-2 in FIG. 1 showing gates in different positions.
Figure 2A:
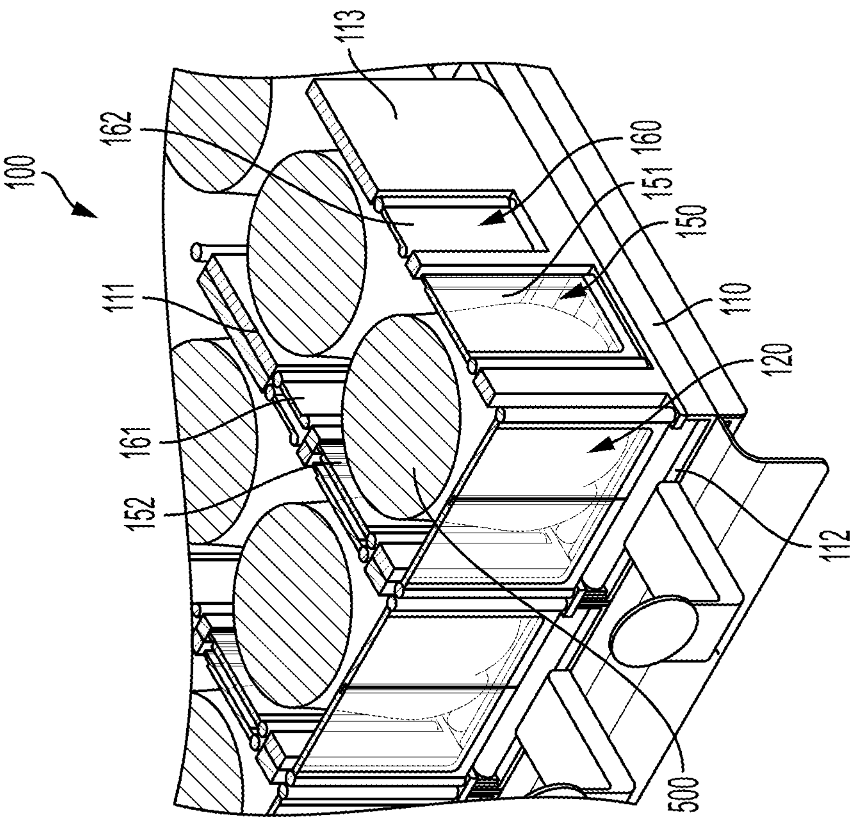

In some embodiments, a first gate 120 may be arranged at first end 112 of platform 110, and a second gate 150 may be spaced from first gate 120 at a position between first end 112 and second end 114 of platform 110, as best shown in FIGS. 2A and 2B. In operation, first gate 120 may remain in a closed position until a product is dispensed, and second gate 150 may remain in an open position to allow products to move along platform 110, as shown in FIG. 2A. When dispensing a product, first gate 120 may open to allow the consumer to access a first product, while second gate 150 may move to a closed position to prevent consumer from retrieving any additional products, as shown in FIG. 2B. As second gate 150 closes, second gate 150 may also help to push first product toward first end 112 of platform 110. After a consumer removes the first product, first gate 120 may return to the closed position to prevent the consumer from accessing products, and second gate 150 may return to the open position to allow a second product to advance toward first end 112 of platform 110.

In some embodiments, product release mechanism 100 may further include a third gate 160 rearward of second gate 150 that is arranged between second gate 150 and second end 114 of platform 110, as best shown in FIGS. 2A and 2B. Third gate 160 may be movable from an open position in which products may advance toward first end 112 of platform 110 to a closed position in which products on platform 110 are prevented from advancing toward first end 112 of platform 110. First and second gates 120, 150 may be used to control access to products, whereas third gate 160 may control advancing of products. In operation, third gate 160 may remain in an open position (see, e.g., FIG. 2A) until a product is dispensed in order to allow products to move along platform 110. When dispensing a product, third gate 160 may move to a closed position (see, e.g., FIG. 2B) to prevent products from advancing toward first end 112, which may interfere with operation of second gate 150.

In some embodiments, as shown in FIG. 1, platform 110 may include a stopper 105 arranged at a first end 112 of platform 110. Stopper 105 may extend from platform 110 in an upright orientation to prevent a product from moving beyond first end 112 of platform 110, and thus from falling off of platform 110. In some embodiments, stopper 105 may include an extension 106 such that stopper 105 is arranged in front of first end 112 of platform 110. In this way, a product may be released through first gate 120 onto extension 106 and held in place by stopper 105 (see, e.g., FIG. 2B). This may facilitate retrieval of the product by the consumer, and closing of second gate 150 behind the released product.

Figure 3:
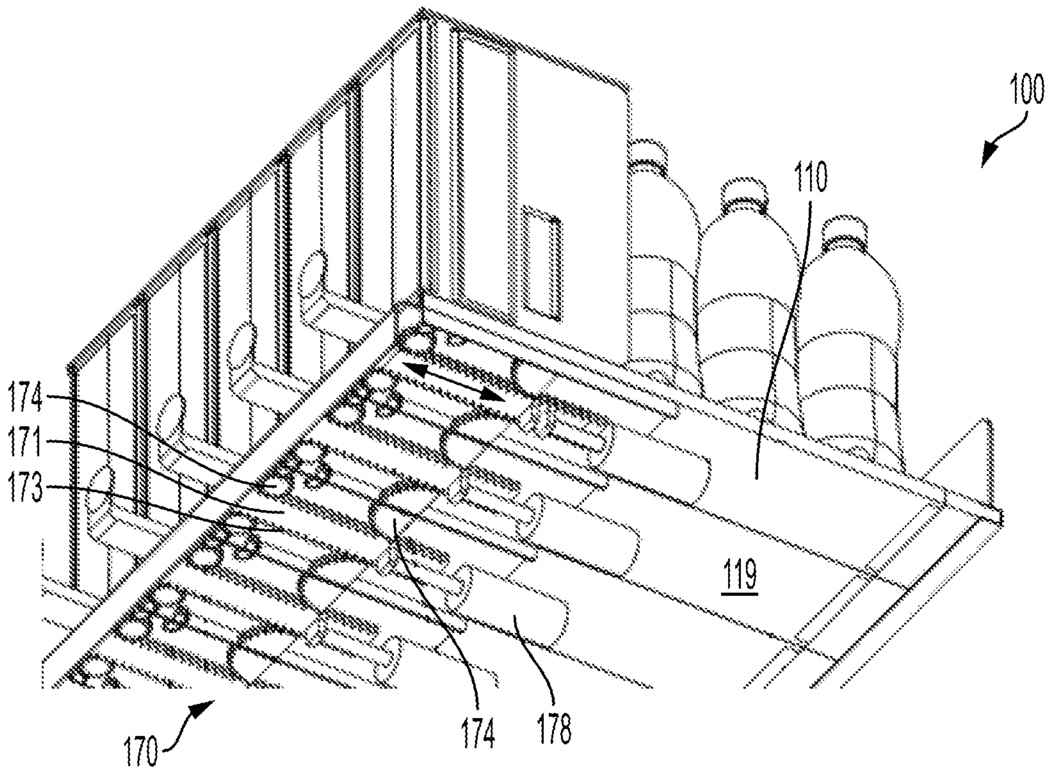
FIG. 3 shows a bottom perspective view of the product release mechanisms of FIG. 1.

Product release mechanism 100 may include a gate control mechanism 170 configured to control opening and closing of one or more of first, second, and third gates 120, 150, 160, as shown for example in FIG. 3. In some embodiments, gate control mechanism 170 may include a rack and pinion wherein a rack 171 having a plurality of teeth 173 engages a pinion 174 connected to a gate. As rack 171 is moved linearly, such as in a longitudinal direction of platform 110 (e.g., a direction from first end to second end or from second end to first end), pinions 174 rotate which in turn causes rotation or opening and closing of the associated gate.

Figure 4:
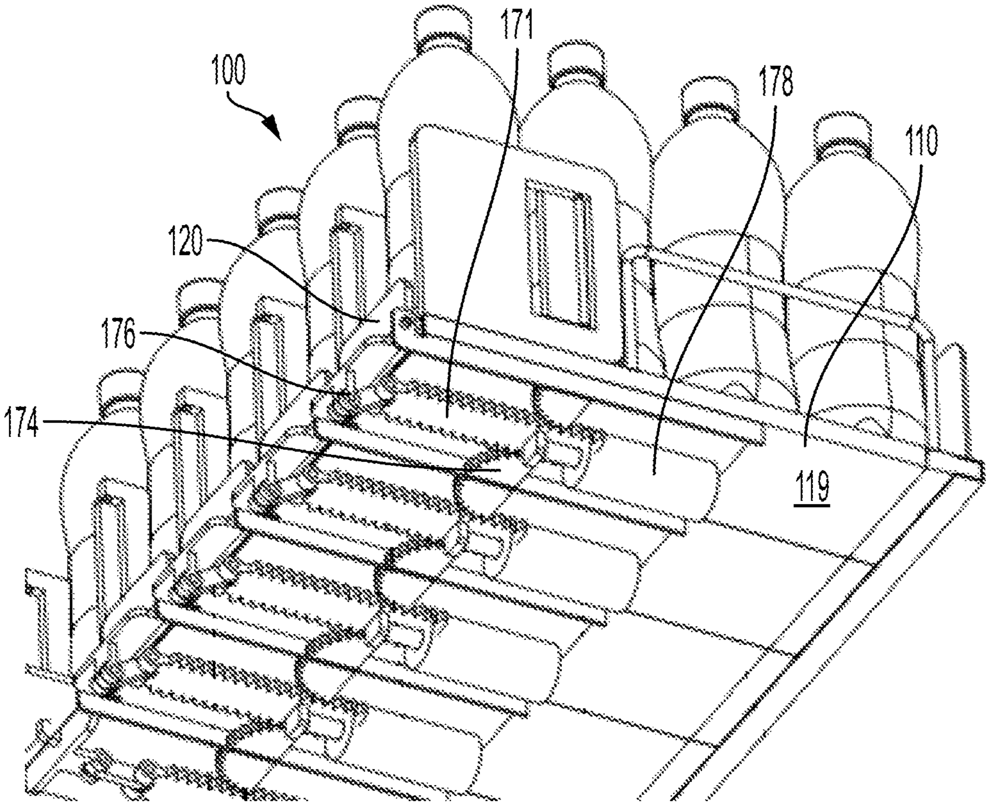
FIG. 4 shows a bottom perspective view of product release mechanisms according to an embodiment.

In some embodiments, rack 171 of gate control mechanism 170 may be connected to a linkage 176 rather than a pinion that controls opening and closing of a gate, as shown for example in FIG. 4. As rack 171 is moved linearly, the movement of rack 171 may actuate the linkage 176 to cause opening and closing of the gate connected to linkage 176, such as gate 120 in FIG. 4. Rack 171 may be linearly actuated in forward and backward directions by a solenoid 178. Gate control mechanism 170 may be arranged on a bottom surface 119 of platform 110. In this way, gate control mechanism 170 has a compact configuration and is not readily visible to a consumer using vending machine having product release mechanism 100.

In some embodiments, a single gate control mechanism 170 may control both first and second gates 120, 150. Alternatively, first and second gates 120, 150 may each have their own gate control mechanism 170. Additionally, third gate 160 may be controlled by the same gate control mechanism 170 used to control one or both of first and second gates 120, 150 or third gate 160 may have its own gate control mechanism 170.

First gate 120 of product release mechanism 100 may be have any of various shapes and configurations as described herein. First gate 120 may include one or more panels individually movable from a closed position to an open position. First gate 120 may be movable from the closed position to the open position such as by pivoting about a hinge, rotating around an axis, or sliding along a track. First gate 120 may include a transparent material, an opaque material, or a combination thereof. First gate 120 may have a height that is the same as or less than a height of the product. First gate 120 may be generally planar or may have a curvature, such as a convex curvature.

Second gate 150 may include a single panel or may include a pair of panels 151, 152, as shown in FIG. 2A. In some embodiments, second gate 150 may be pivotally connected to a first rail 111 or a second rail 113 of product release mechanism 100. In embodiments having a pair of panels, first panel 151 may be pivotally connected to first rail 111 and a second panel 152 may be pivotally connected to second rail 113. In some embodiments, second gate 150 may be arranged in an opening formed in first rail 111 or second rail 113 in the open configuration (see, e.g., FIG. 2A). In this way, second gate 150 forms a portion of the rail and does not interfere with advancement of products along platform 110. Second gate 150 may rotate to a closed position in which second gate 150 is arranged transversely to platform 110 and rails 111, 113 (see, e.g., FIG. 2B). When second gate 150 has a pair of panels 151, 152, the pair of panels may meet in an end-to-end manner in the closed position to block access to products rearward of second gate 150.

Third gate 160 may include a pair of arms, with a first arm connected to a first rail 111 and a second arm connected to a second rail 113. Arms 161, 162 may be arranged in a recess of the rail in the open position and may extend inward from rail 111, 113 in the closed position. In the closed position, arms 161, 162 may extend at an angle relative to rails 111, 113 such as an angle of about 10 degrees to about 60 degrees. In the closed position, arms 161, 162 of third gate 160 may not meet so that an opening is formed between arms 161, 162.

Figure 5:
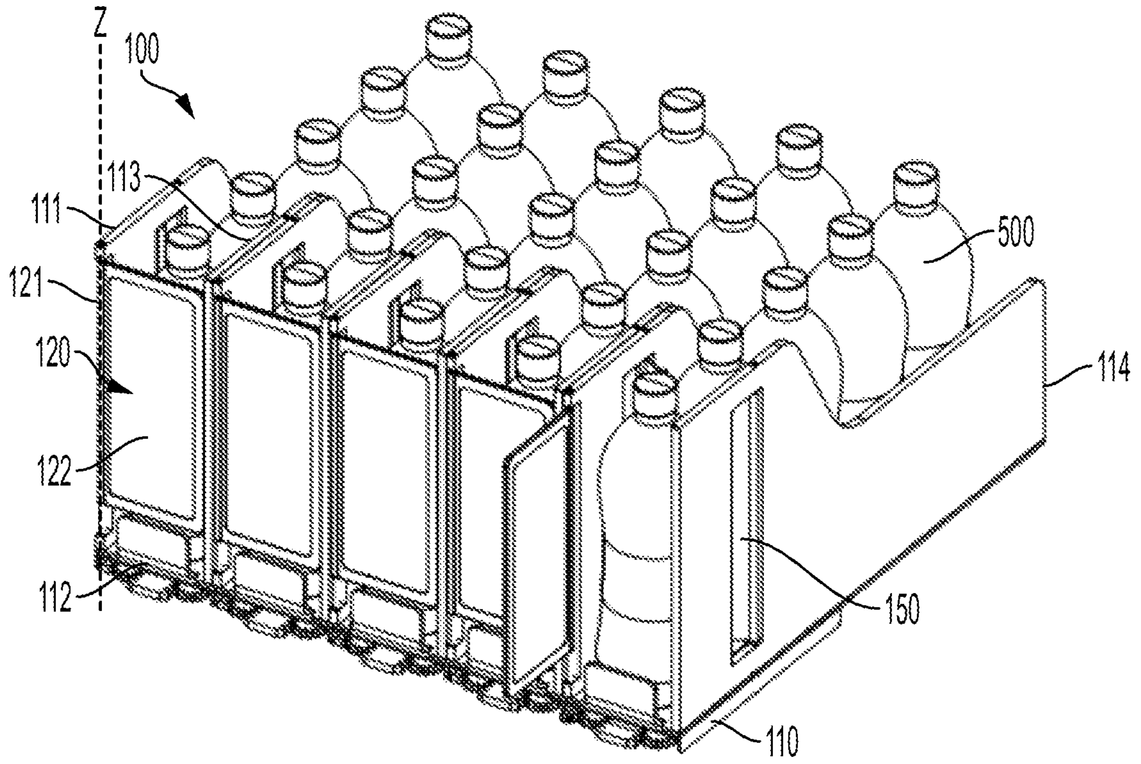
FIG. 5 shows a perspective view of product release mechanisms having a gate according to an embodiment.

In some embodiments, product release mechanism 100 may include first gate 120 that includes a single panel 122 pivotable about a hinge 121 arranged at a side of panel 122, as shown in FIG. 5. Hinge 121 may connected to a rail 111, 113 of platform 110, such that panel 122 rotates about a vertical axis Z defined by hinge 121. Panel 122 may be substantially planar and may have a rectangular shape. Panel 122 of first gate 120 may have a width that corresponds to a width of platform 110 so that panel 122 extends from first rail 111 to second rail 113 in the closed position to block access to product from first end 112 of platform 110. Panel 122 of first gate 120 may have a height that is the same as or slightly greater than a height of the product. In this way, when first gate 120 is in the closed position, first gate 120 may prevent consumers from accessing a product to prevent theft of products. In some embodiments, however, panel 122 may have a height that is less than a height of the product, such as a height of about 50% of a height of the product, as shown for example in FIG. 14. Panel 122 may be shorter than product 500 so that first gate 120 allows a portion of the product above or below first gate 120 to be viewed by the consumer. Panel 122 may be formed of an opaque material to obscure the view of product 500. However, in some embodiments, first gate 120 may include transparent or translucent materials so that products are visible and can be seen by consumers through first gate 120.

Figure 6:
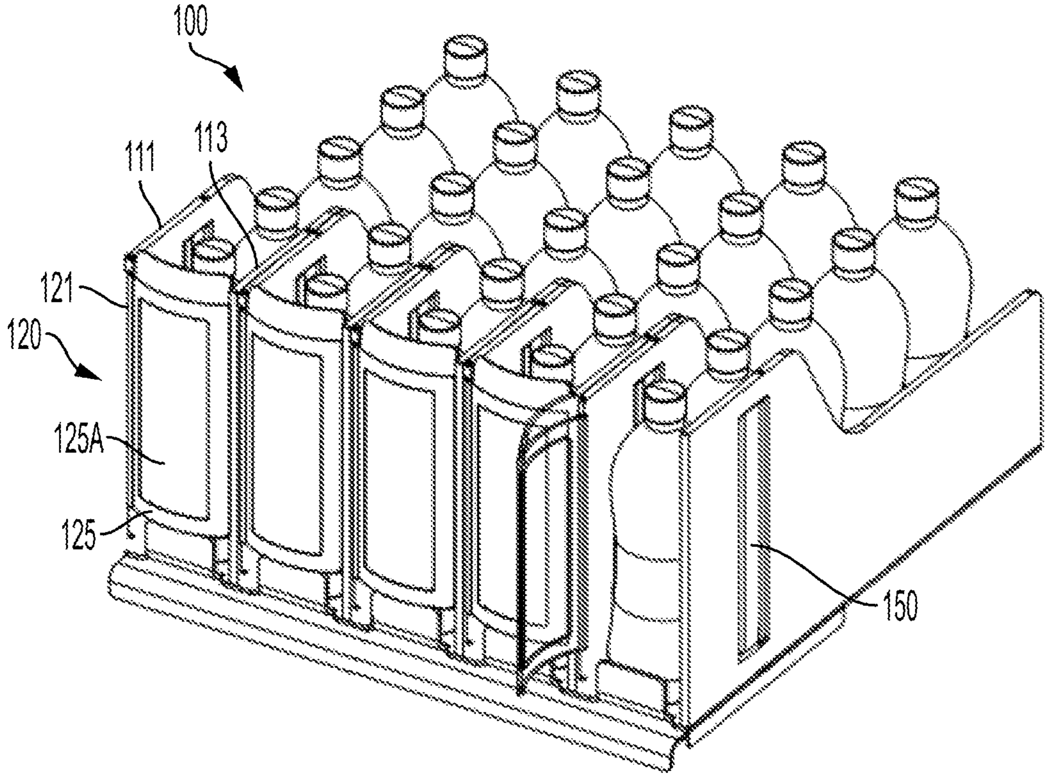
FIG. 6 shows a perspective view of product release mechanisms having a gate according to an embodiment.

In some embodiments, product release mechanism 100 may include a first gate 120 and a second gate 150, as shown in FIG. 6. First gate 120 may include a single panel 125 similar to the embodiment of FIG. 5, but panel 125 of first gate 120 may have a curvature. Panel 125 may have a hinge 121 along a side thereof that is connected to a rail, such as first rail 111. However, in alternate embodiments, panel 125 may instead have a hinge 121 on the opposing side that is connected to second rail 113. Panel 125 may have a height that is about the same as or greater than a height of the product. Panel 125 may have a convex curvature, so as to match a curvature of a product, such as a bottle or can. However, in some embodiments, panel 125 may have a concave curvature or a wave-like curvature to provide visual interest. Panel 125 may extend from first rail 111 to second rail 113 in the closed position in order to block access to product 500. Panel 125 may include a solid or opaque material and may include a window 125A having a transparent material so that a portion of product is visible through window 125A.

In some embodiments, product release mechanism 100 may include a first gate 120 having two panels 123, 124, as shown in FIG. 1. In such embodiments, a first panel 123 may be rotatably coupled to a first rail 111 and a second panel 124 may be rotatably coupled to a second rail 113. In a closed position, first and second panels 123, 124 meet in an end-to-end manner to form a barrier that blocks access to a product. In an open position, first and second panels 123, 124 may pivot about hinges to allow the product to be accessed. In some embodiments, first and second rails 111, 113 may have a height that is the same as or slightly greater than a height of the product, and a cover 115 may be arranged at an upper end of rails 111, 113 so as to form an enclosure around a product or products at or adjacent first end 112 of platform 110.

Figure 7:
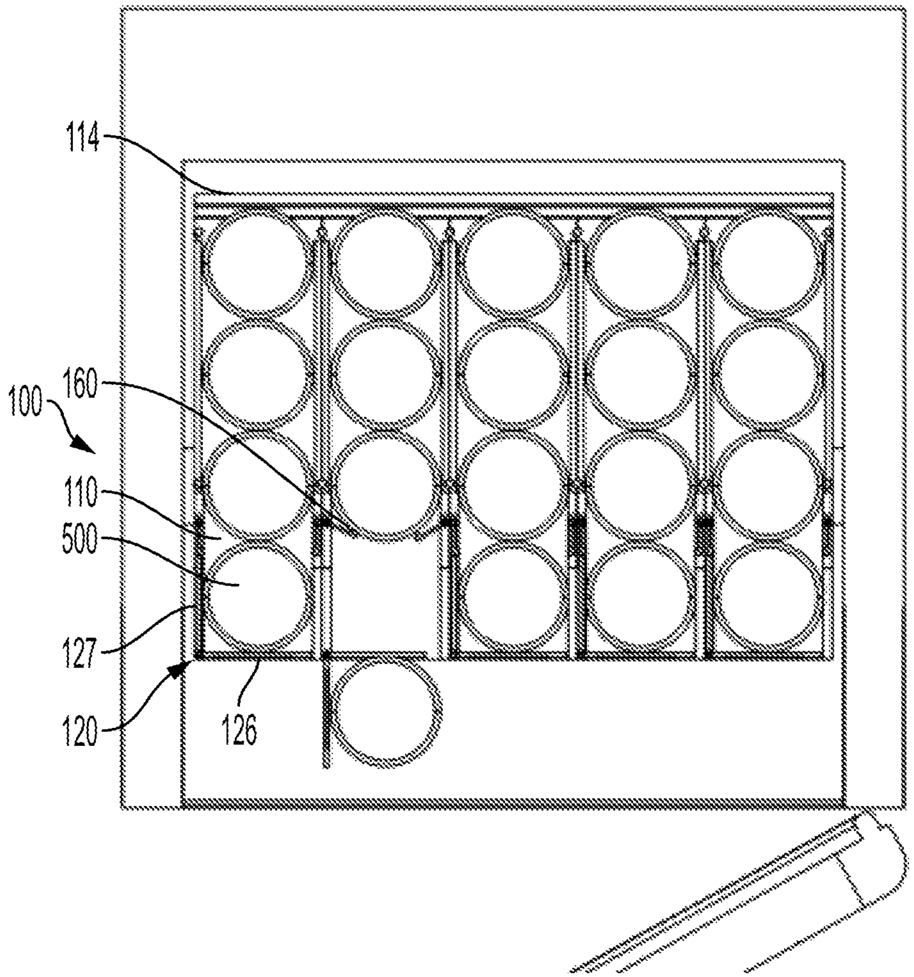
FIG. 7 shows a top-down view of product release mechanisms having a gate according to an embodiment.

In some embodiments, product release mechanism 100 may include a single gate 120 that provides access to a product and that also prevents access to additional products, as shown in FIG. 7. In some embodiments, gate 120 may include a first panel 126 and a second panel 127 connected to and perpendicular to first panel 126. Thus, gate 120 may have an L-shape. In a closed position, first panel 126 may be arranged transversely to platform 110 so as to block access to a product on platform 110, and second panel 127 may extend rearwardly toward second end 114 of platform 110 and parallel to first rail 111. To dispense a product, gate 120 may rotate toward first end 112 of platform 110 such that second panel 127 helps to push product 500 toward first end 112 to dispense the product, and first panel 126 rotates outwardly to provide access to the product. In the open position, second panel 127 may be arranged transversely to platform 110 to block access to additional products on platform 110. Gate 120 may rotate by about 90 degrees from the closed position to the open position and vice versa. In such embodiments, product release mechanism 100 may include a third gate 160 for controlling advance of additional products as described above. Third gate 160 may be open when gate 120 is in the closed position and may move to a closed position to prevent advance of products when gate 120 is in the open position. The use of a single gate 120 to release a product and prevent access to additional products may simplify construction and operation of product release mechanism 100. Gates 120, 160 may be controlled by a gate control mechanism 170 as described above.

In some embodiments, gate 120 may include a pair of L-shaped panels with a first L-shaped panel pivotably connected to a first rail 111 and a second L-shaped panel pivotably connected to the opposing second rail 113, similar to first gate 120 of FIG. 1 but having a pair of L-shaped panels.

Figure 8:
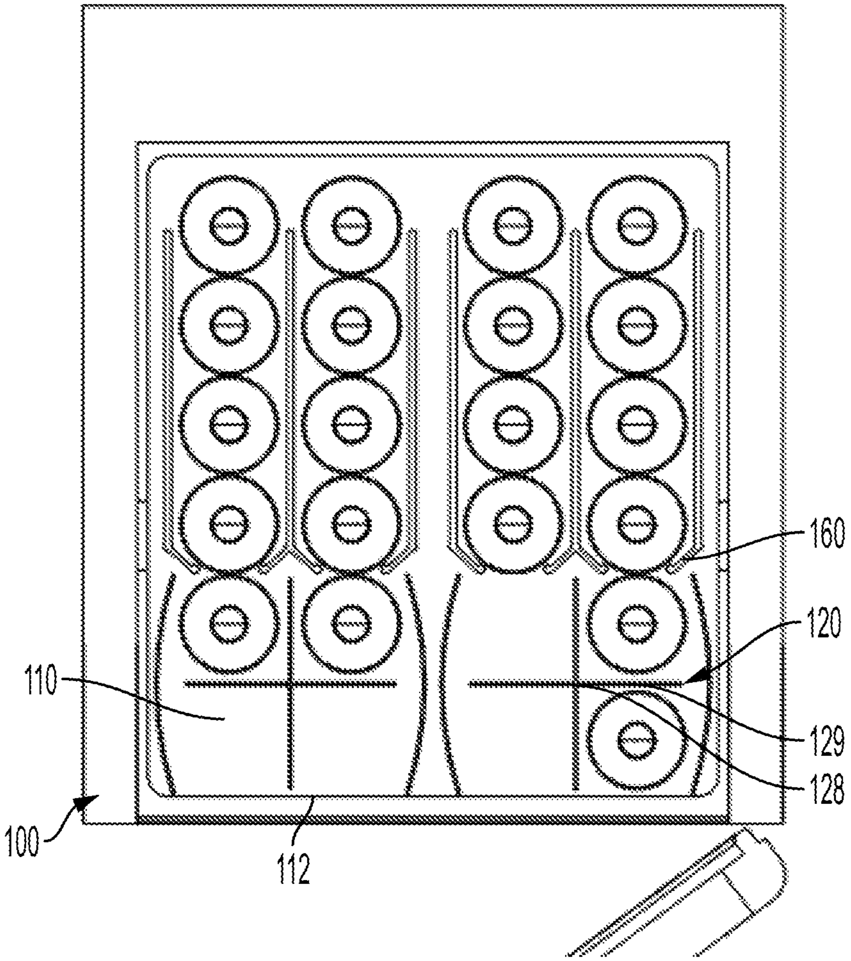
FIG. 8 shows a top-down view of product release mechanisms having a gate according to an embodiment.

In some embodiments, product release mechanism 100 may include a first gate 120 formed as a turnstile, as shown for example in FIG. 8. First gate 120 may serve to release a product while blocking access to additional products. First gate 120 may include a central post 128 with a plurality of panels 129 extending therefrom. In FIG. 8, four panels 129 extend from central post 128 so as to form an X- or plus-sign-shape. When first gate 120 has four panels 129, first gate 120 defines four product areas. In some embodiments, first gate 120 may be used to release products from two platforms 110 and two rows of products, as shown in FIG. 8. As products advance toward first end 112 of platform 110, products enter rear product areas defined by first gate 120, wherein the rear product areas are not accessible by consumers. As first gate 120 rotates about central post 128 the products are advanced to forward areas of first gate 120 that are accessible by the consumer. To release a product, first gate 120 may rotate by a fixed number of degrees, e.g., 90 degrees. In such embodiments, product release mechanism 100 may include a third gate 160 for controlling advancement of products toward first gate 120 as described above.

Figure 9:
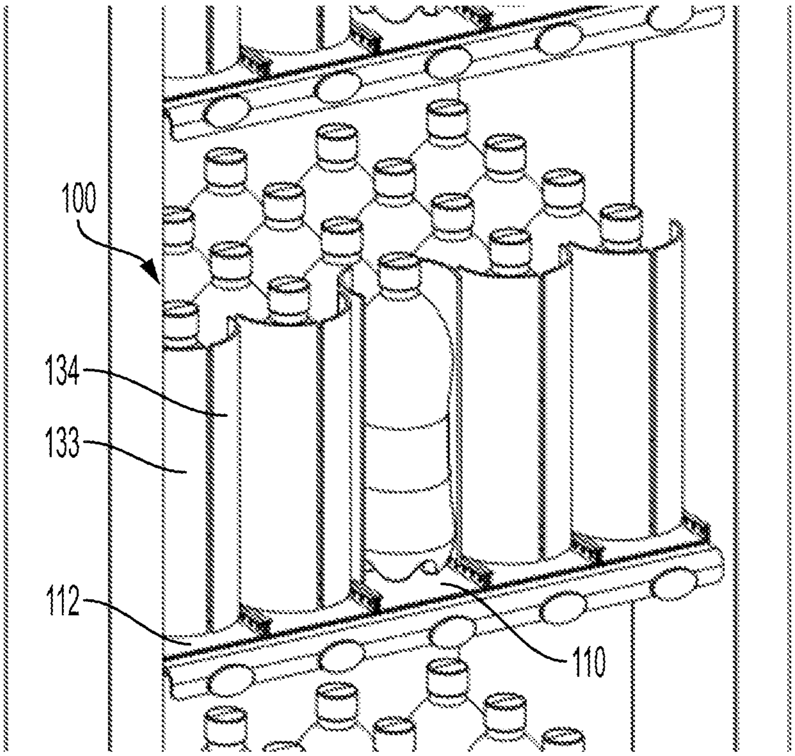
FIG. 9 shows a perspective view of a vending machine having product release mechanisms according to an embodiment.
Figure 10:
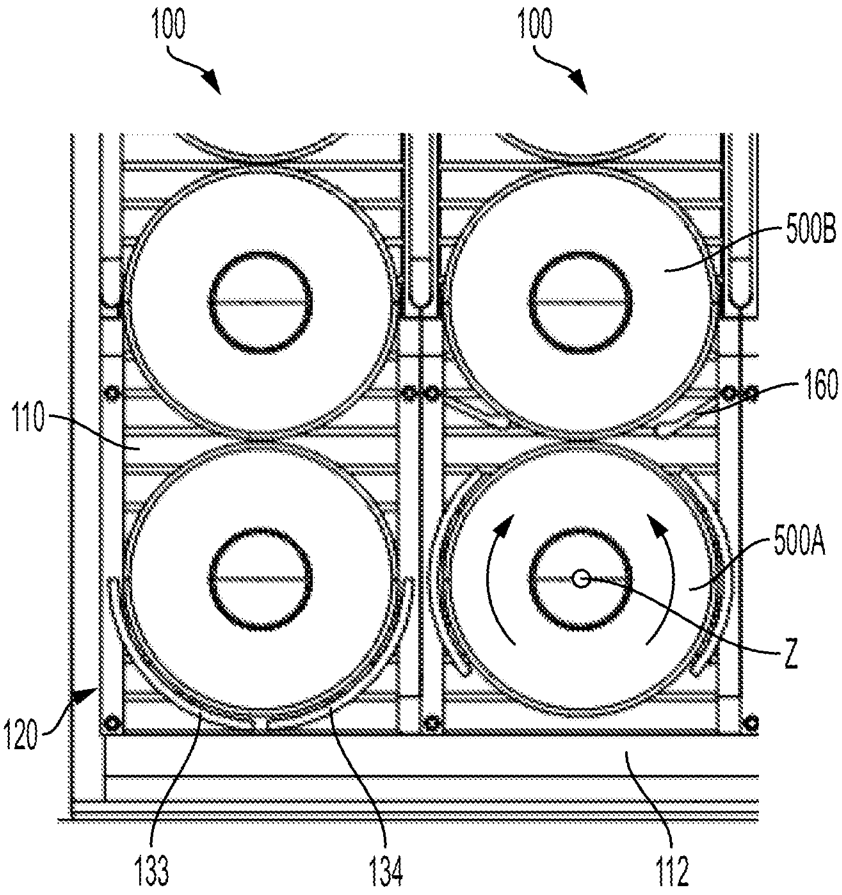
FIG. 10 shows a top-down view of the product release mechanism of FIG. 9.

In some embodiments, product release mechanism 100 may include a single gate formed by a pair of curved panels 133, 134, as shown in FIGS. 9 and 10. Curved panels 133, 134 may each be formed as an arc of a circle. Curved panels 133, 134 may be configured to rotate along a circular path at a first end 112 of platform 110. First and second curved panels 133, 134 may be arranged side-by-side in front of product 500 in the closed position to form a barrier that blocks access to product. Product release mechanism 100 may include a third gate 160 arranged rearward of first gate 120 that controls advancing of products along platform 110 as described above.

First and second curved panels 133, 134 may rotate about a central axis Z, as shown in FIG. 10. In order to move from closed position to open position, a first curved panel 133 may rotate in a clockwise direction, while a second curved panel 134 may rotate in an opposing, counterclockwise direction such that first and second curved panels 133, 134 meet in a side-by-side manner at a location behind or rearward of a first product 500A to allow a consumer to access the first product 500A while blocking access to a second product 500B (and any additional products). In some embodiments, gate 120 may instead include a single C-shaped panel that may be arranged in front of a product in the closed position to block access to all products, and may rotate approximately 180 degrees in a clockwise or counterclockwise direction to a position behind the product to provide access to a single product while preventing access to additional products.

Figure 11:
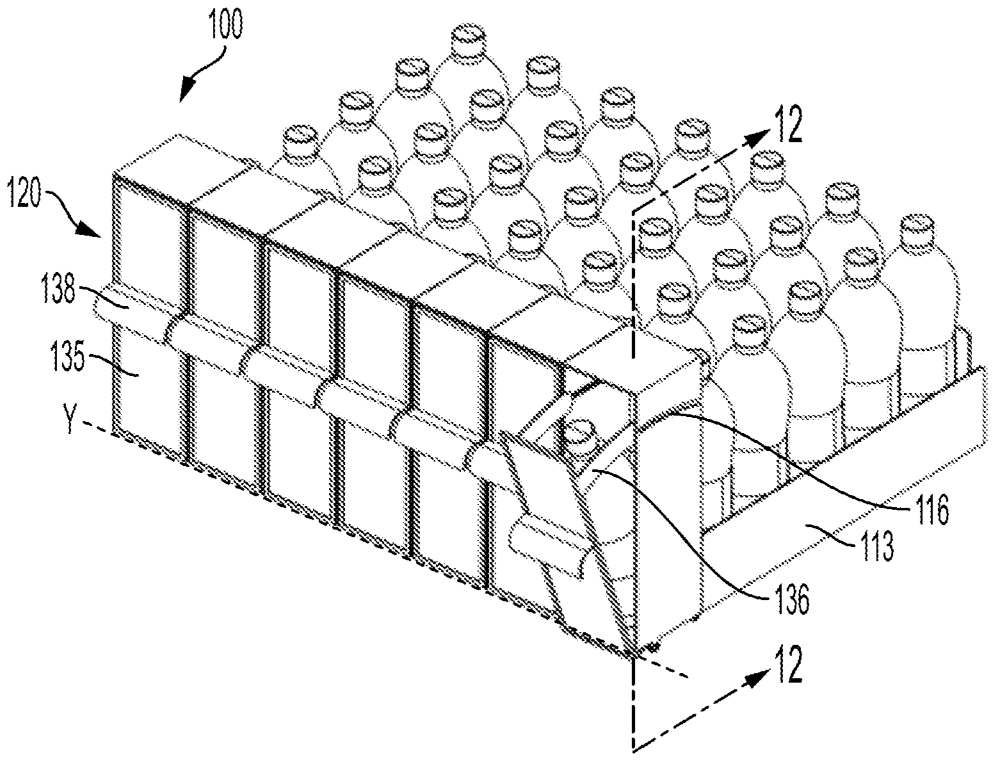
FIG. 11 shows a perspective view of product release mechanisms having a gate according to an embodiment.
Figure 12:
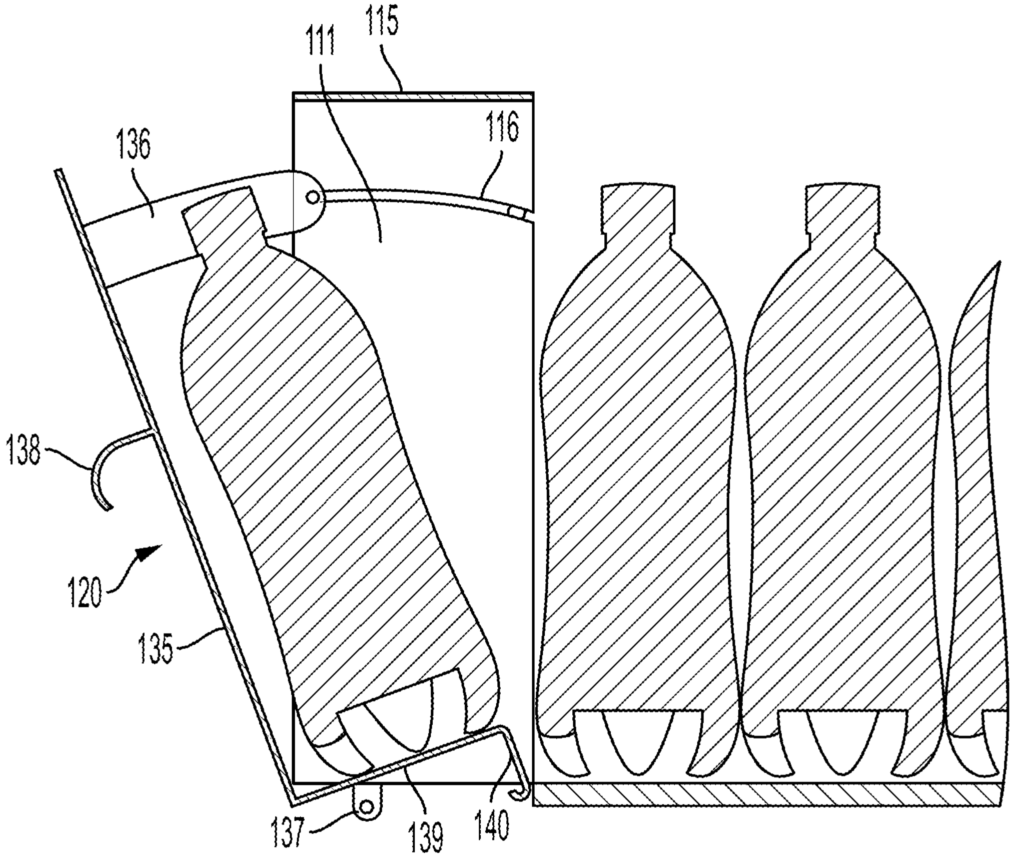
FIG. 12 shows a cross-sectional view of the product release mechanism of FIG. 11 as taken along lines 12-12 in FIG. 11.

In some embodiments, product release mechanism 100 may include a gate 120 configured to provide access to a product and also to prevent access to additional products, as shown in FIGS. 11 and 12. Gate 120 may include a panel 135 configured to pivot or tilt outwardly along a horizontal axis Y. In some embodiments, panel 135 may include arms 136 that slide along slots 116 defined by first and second rails 111, 113. Panel 135 may have a hinge 137 along a bottom edge of panel 135 that is connected to first end 112 of platform 110 to allow panel 135 to tilt outwardly. In this way, panel 135 may rotate about horizontal axis Y defined by hinge 137. In a closed position, panel 135 may be arranged perpendicular to platform 110 in a vertical orientation to block access to products on platform 110. In an open position, panel 135 may rotate or tilt outwardly to provide access to a frontmost product on platform 110. In some embodiments, gate 120 may be spring-biased so as to be biased in the closed configuration.

In some embodiments, gate 120 may include a base 139 on which product rests, as best shown in FIG. 12. Base 139 may be parallel to or flush with platform 110 when gate 120 is in the closed position such that a product may advance from platform 110 onto base 139. When gate 120 is moved to the open position, product resting on base 139 tilts forward for retrieval by the consumer. Base 139 may further include a flange 140 at a rear end opposite panel 135 that extends above a plane of platform 110 to prevent additional products from advancing forward when gate 120 is open. In some embodiments, panel 135 may include a handle 138 to allow the consumer to more easily rotate and open gate 120.

In some embodiments, first and second rails may have a height that is the same as or greater than a height of products, and a cover 115 may be arranged at upper end of rails to form an enclosure around product at first end 112 of platform 110. This may help to further limit access to and theft of products.

Any of the various product release mechanisms 100 described herein may be arranged in a product compartment of a vending machine for releasing and products from a platform or for controlling access to products. Product release mechanisms 100 may be incorporated into a newly constructed vending machine, or may be retrofitted into an existing vending machine. For example, gates of product release mechanisms 100 may be arranged on a shelf of the existing vending machine and gate control mechanism may be arranged on a lower surface of the shelf of the vending machine. In newly constructed vending machines, gates and gate control mechanism may be pre-assembled on a platform or shelf.

The vending machine may include a user interface for receiving a payment, receiving a user selection of a product, or both. Product release mechanism may be actuated to release a product corresponding to the user selection. In some embodiments, user interface may include a touch screen display, a keypad, or a plurality of actuators, e.g., buttons, levers, switches, each corresponding to a single product release mechanism. In some embodiments, vending machine may be configured to communicate wirelessly with a mobile electronic device of a consumer, such as a smartphone, or may include a reader or scanner to read a barcode displayed by the consumer, such as by displaying a QR code on a smartphone of the consumer, wherein the QR code may encode a product selection, a payment method, or both. The user interface may be arranged on an exterior of vending machine or may be accessed once door of vending machine is opened. In some embodiments, the actuator may mechanically control actuation of a gate control mechanism.

In an exemplary method of operation, a vending machine may receive payment from a consumer. Payment may be received via a user interface of the vending machine, such as by receipt of paper money, reading a payment card, scanning a barcode, such as a QR code, or by wireless communication, among other payment methods. When payment is received, a gate control mechanism of a product release mechanism of vending machine may release a product for access by consumer while restricting access to additional products. In some embodiments, each product release mechanism may include an indicator light, such as an LED light, that may blink or illuminate to indicate to the consumer that a gate is opened or unlocked for access by the consumer. In some embodiments, the gate may remain open only for a predetermined period of time and may automatically close or lock upon expiration of the predetermined period of time. In some embodiments, a gate may remain open or unlocked until a product is removed, as may be detected by a product removal sensor, and upon removal of the product, the gate may close or lock.

Figure 13:
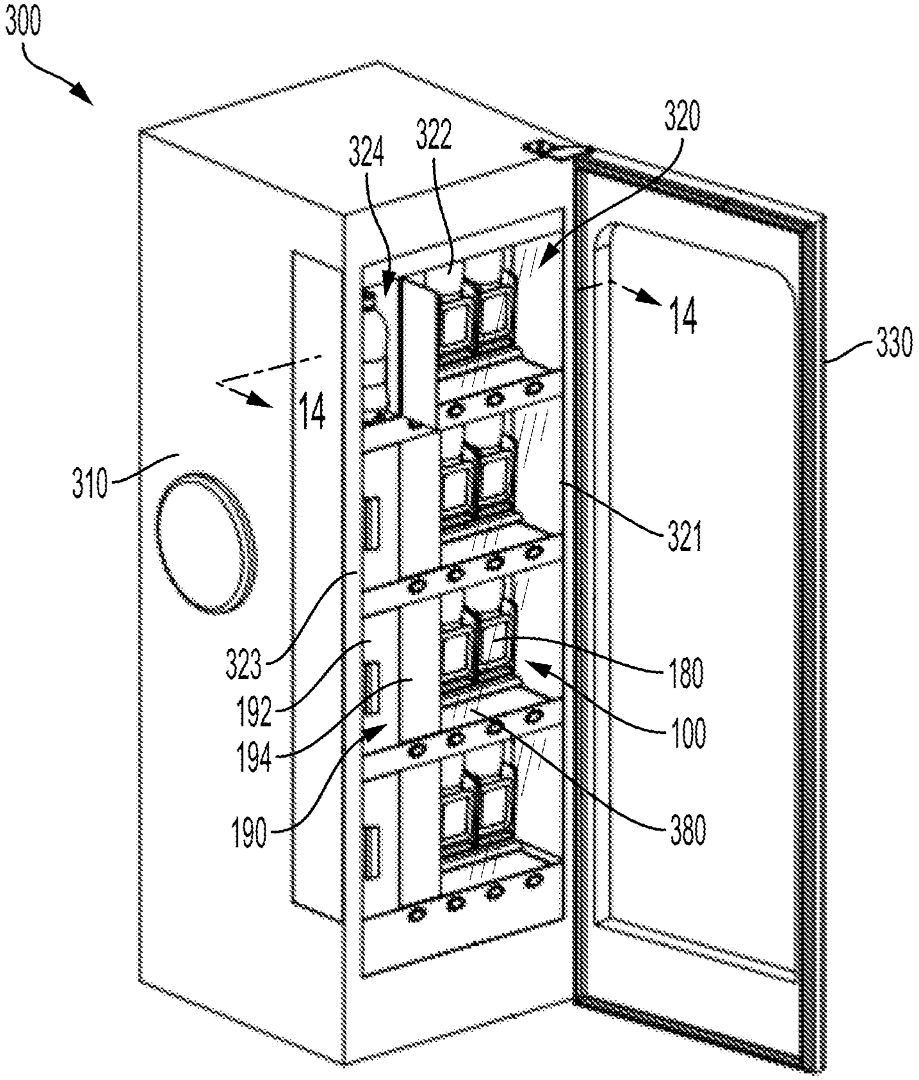
FIG. 13 shows a perspective view of a vending machine according to an embodiment.

Some embodiments described herein relate to a vending machine 300 having a delivery mechanism, as shown for example in FIG. 13. Vending machine 300 may include a housing 310 defining a product compartment 320, and a door 330 movably connected to housing 310 to selectively provide access to product compartment 320. Product compartment 320 may not be fully accessible to consumer, and a product compartment panel 322 may at least partially cover product compartment 320 to prevent access to product compartment 320. Product compartment panel 322 may extend from a first side 321 of product compartment 320 toward an opposing second side 323. Product compartment panel 322 may include a transparent material so that products within product compartment 320 are visible to consumers using vending machine 300. A product retrieval area 324 may not be covered by product compartment panel 322 to provide a consumer with limited access to product compartment 320.

Figure 14:
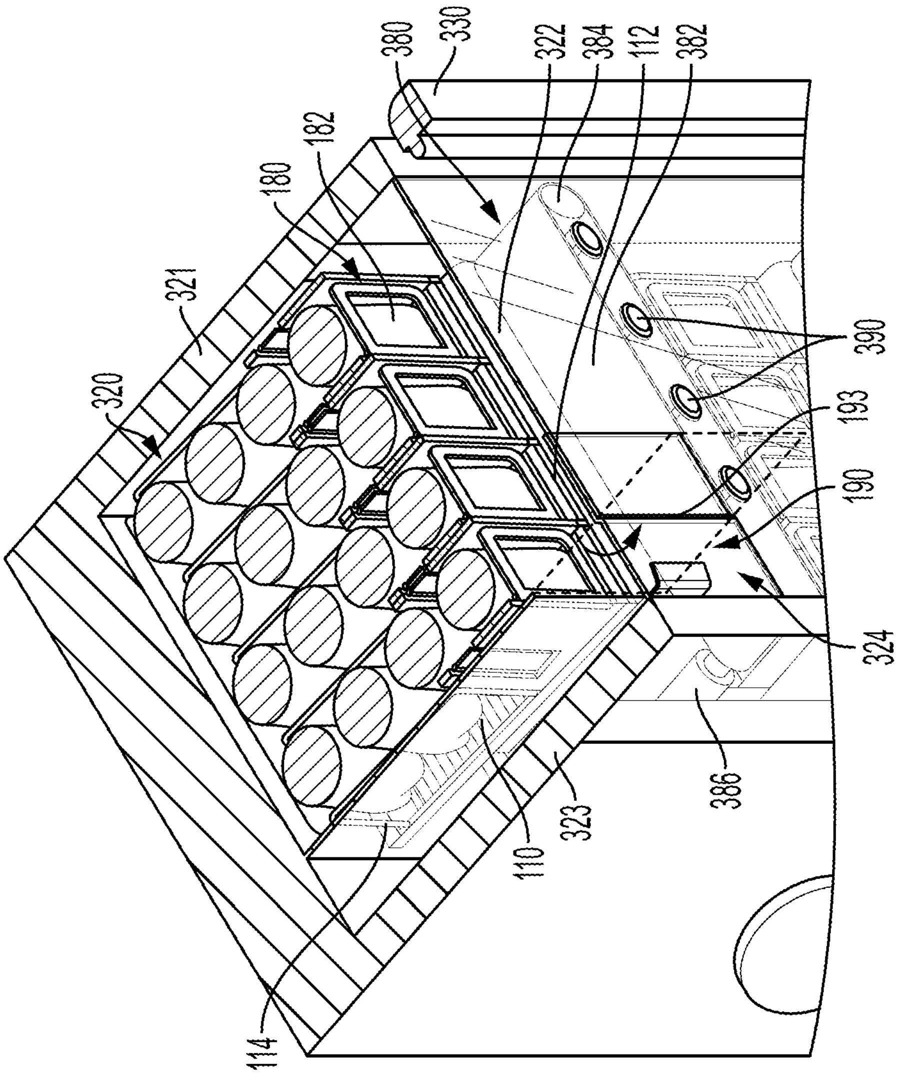
FIG. 14 shows a cross sectional view of the vending machine of FIG. 13 as taken along lines 14-14 in FIG. 13.

Vending machine 300 may include a plurality of rows of products and product release mechanisms 100, as best shown in FIG. 14. Each product release mechanism 100 may include a platform 110 having a first end 112 opposite a second end 114 as described above. A release gate 180 may be arranged at first end 112 of platform 110 that is movable from an open position to a closed position. Release gate 180 may have any of the configurations described above for gate 120. As shown in FIG. 14, release gate 180 includes a single panel 182 having a hinge on a side of panel 182 and connected to a rail of product release mechanism 100, similar to gate 120 of FIG. 5. Release gate 180 has a height that is less than a height of product 500. As product compartment 320 is not directly accessible by consumers, gate 180 need not fully cover product to prevent theft or tampering, as product compartment panel 322 prevents access to products in product compartment 320. Vending machine 300 may include a user interface with a plurality of actuators 390 to be operated by a consumer to initiate dispensing of a product, and each actuator 390 may correspond to a specific release gate 180.

A delivery mechanism 380 may be arranged at first end 112 of platforms 110 within product compartment 320 and may be arranged transversely to platforms 110 so as to extend between a first side 321 and opposing second side 323 (e.g., right and left side) of product compartment 320 of vending machine 300. Delivery mechanism 380 may convey a product released from a platform 110 to product retrieval area 324. A dispensing gate 190 may be arranged at product retrieval area 324 that is movable from a closed position in which product retrieval area 324 is inaccessible to an open position in which product retrieval area 324 is accessible to the consumer.

Delivery mechanism 380 may include a conveyor assembly that includes a conveyor belt 382 that forms a continuous loop around one or more rollers 384. At least one of the rollers 384 may be driven by a motor 386 so as to cause rotation of the conveyor belt 382. In operation, a product may be released by product release mechanism 100 by opening release gate 180 so that product is released from platform 110 onto conveyor belt 382. Conveyor belt 382 may convey product to product retrieval area 324. The consumer may manually move dispensing gate 190 from the closed position to the open position to access the product in the product retrieval area 324.

In some embodiments, dispensing gate 190 may include a central hinge 193 and a first panel 192 arranged opposite a second panel 194, such that dispensing gate 190 has a planar configuration. In a closed position, first panel 192 blocks product retrieval area 324 and spans a distance from product compartment panel 322 to second side 323 of product compartment 320, and second panel 194 is arranged generally parallel to product compartment panel 322 inside of product compartment 320. Dispensing gate 190 may rotate approximately 90 degrees about central hinge 193 so that first panel 192 is perpendicular to product compartment panel 322 to provide access to product retrieval area 324, and second panel 194 may be arranged transversely to conveyor belt 382 to prevent the user from reaching into product compartment 320 when dispensing gate 190 is in the open configuration.

Figure 15B:
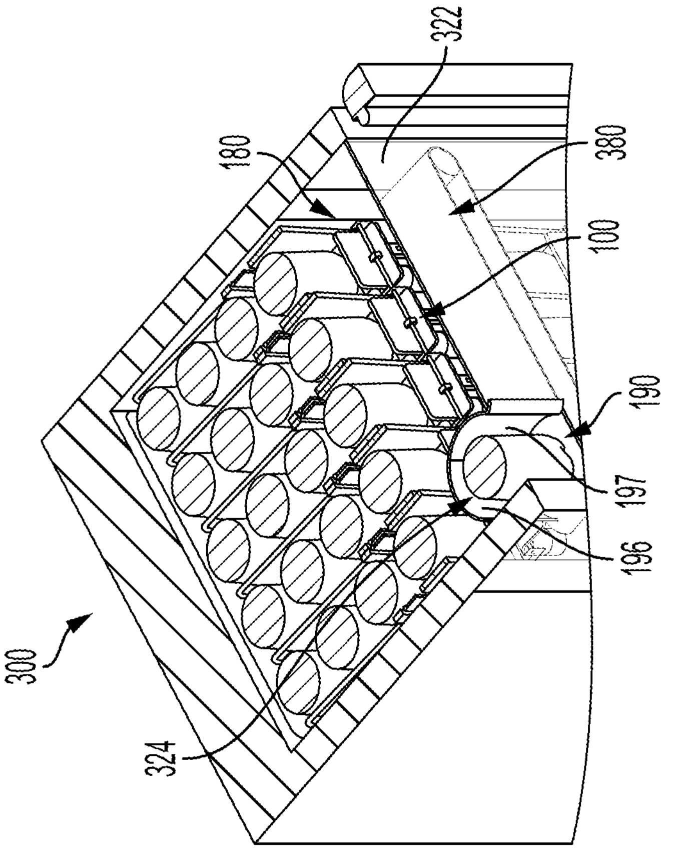
FIGS. 15A and 15B show cross sectional views of a vending machine having gates according to an embodiment.
Figure 15A:
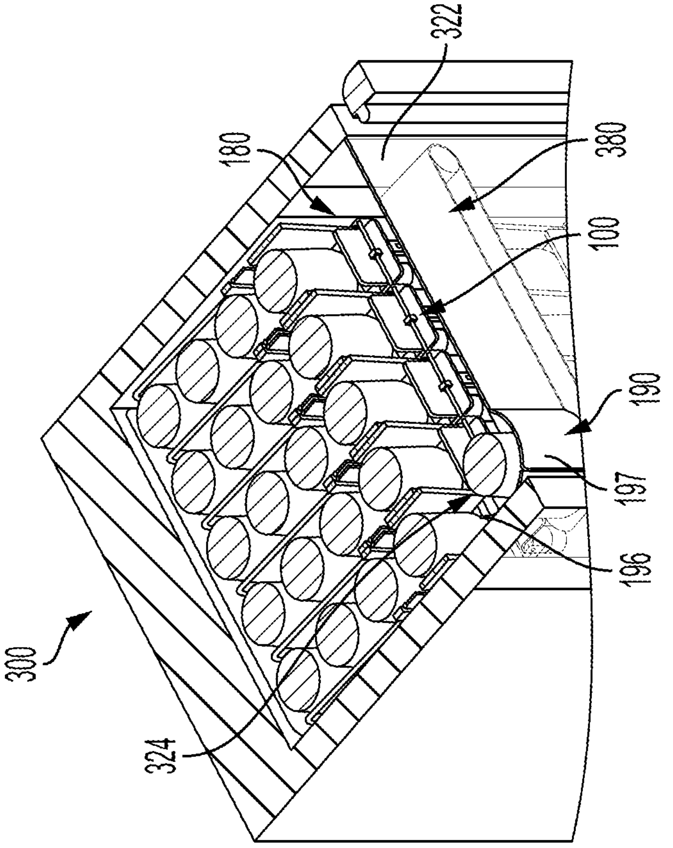

In some embodiments, vending machine 300 may include a release gate 180 and dispensing gate 190 having alternate configurations, as shown in FIGS. 15A and 15B. For example, release gate 180 may include a panel having a hinge along a bottom edge of panel and connected to platform 110. Dispensing gate 190 may include a pair of curved panels 196, 197 configured to rotate about a central axis, as described above with respect to FIGS. 9 and 10. Thus, dispensing gate 190 may include a first curved panel 196 and a second curved panel 197 that may rotate from a closed position to an open position. In the closed position, first and second curved panels 196, 197 are arranged side by side in front of product retrieval area 324 to block access to a product. First and second curved panels 196, 197 rotate in opposing directions to move to the open position in which curved panels 196, 197 are arranged side-by-side behind the product. In the closed position, curved panels 196, 197 may also block access to product compartment 320, as shown in FIG. 15B.

Figure 16B:
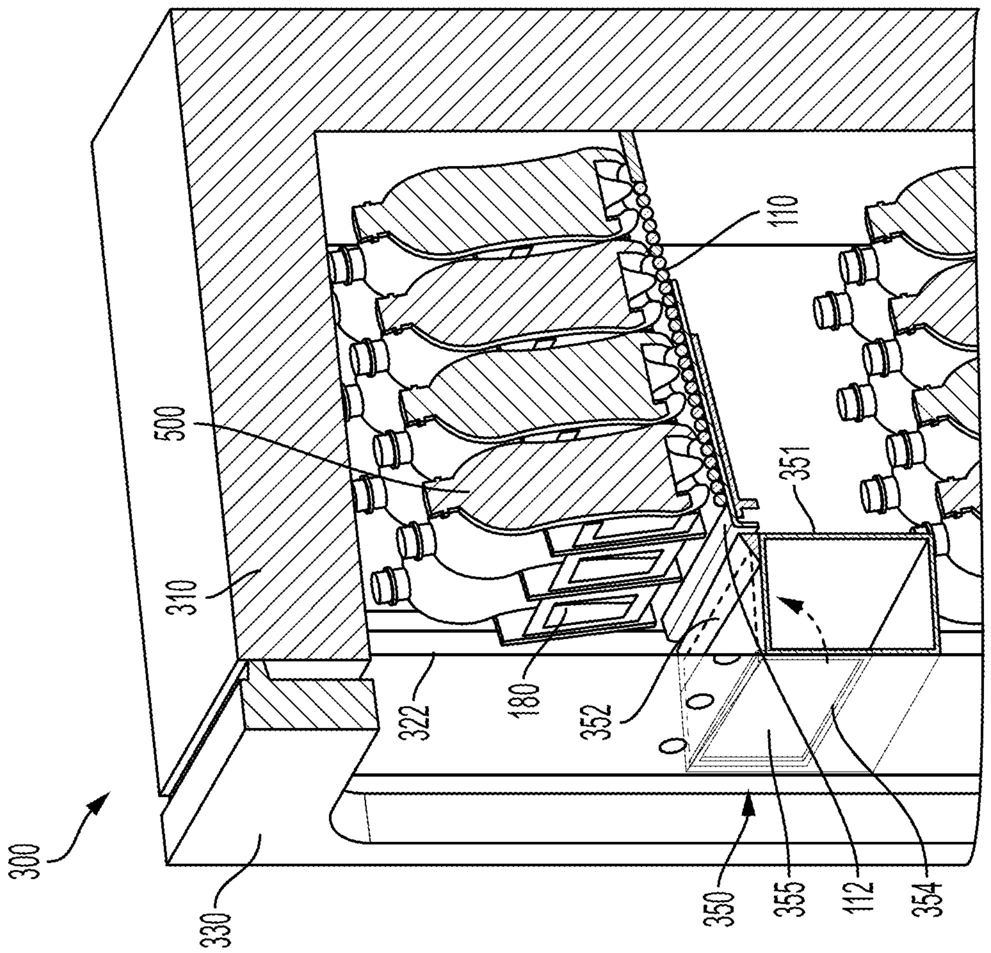
FIG. 16B shows a cross sectional view of the vending machine of FIG. 16A taken along lines 16B-16B in FIG. 16A.
Figure 16A:
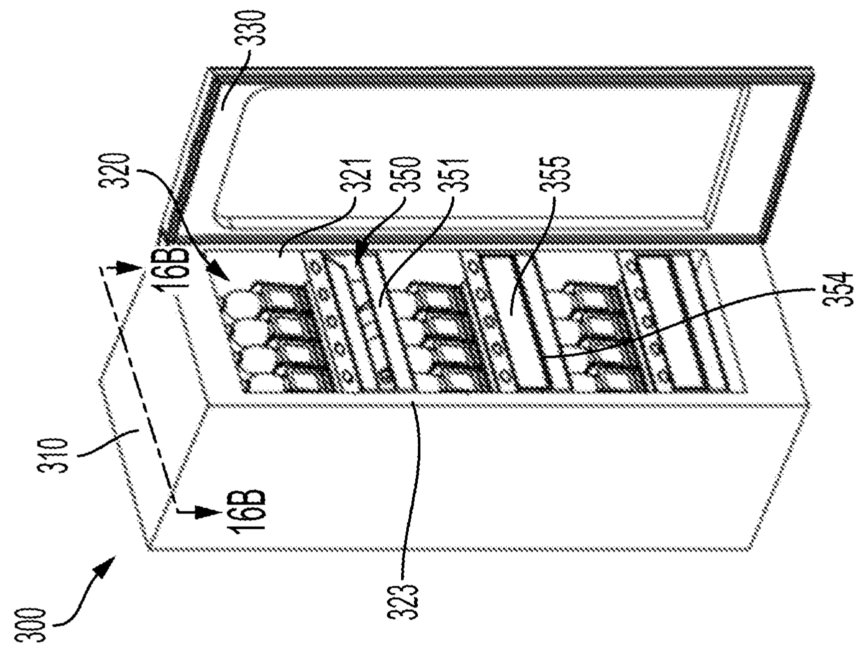
FIG. 16A shows a perspective view of a vending machine having a delivery bin according to an embodiment.

In some embodiments, vending machine 300 may include one or more delivery bins 350 for providing a consumer with access to a dispensed product, as shown for example in FIGS. 16A and 16B. Vending machine 300 may include a housing 310 defining a product compartment 320 for storing products and a door 330 movably connected to housing 310 for providing access to delivery bins 350. Product compartment 320 may include a plurality of product release mechanisms 100 arranged at different elevations. A delivery bin 350 may be arranged at a front end 112 of one or more of the product release mechanisms 100 so that a product released from a platform 110 may fall under a force of gravity into delivery bin 350. A product compartment panel 322 may cover product compartment 320 to prevent a consumer form accessing products in product compartment 320. Consumer may thus have access only to delivery bin 350.

Delivery bin 350 may extend from first side 321 to an opposing second side 323 of product compartment 320 so as to receive a product from any of various product release mechanisms 100. Delivery bin 350 may include a body 351 having an open upper end 352, with the upper end 352 at or below a level of front end 112 of platform 110 such that a product may fall into delivery bin 350 through open upper end 352. Delivery bin 360 may include an open front wall 354 to provide a consumer with access to the product in delivery bin 350. Delivery bin 350 may include one or more flaps 355 movably connected to body 351 of delivery bin 350 and movable from an open position to a closed position. Flaps 355 may be biased in the closed configuration (shown in dotted lines in FIG. 16B) so that upper end 352 is closed, and may open to allow a product to pass therethrough. Flap 355 may help to break the fall of the product into delivery bin 350 to minimize damage or shaking of the product, and may also prevent a consumer from reaching into product compartment 320 through delivery bin 350.

Figure 17:
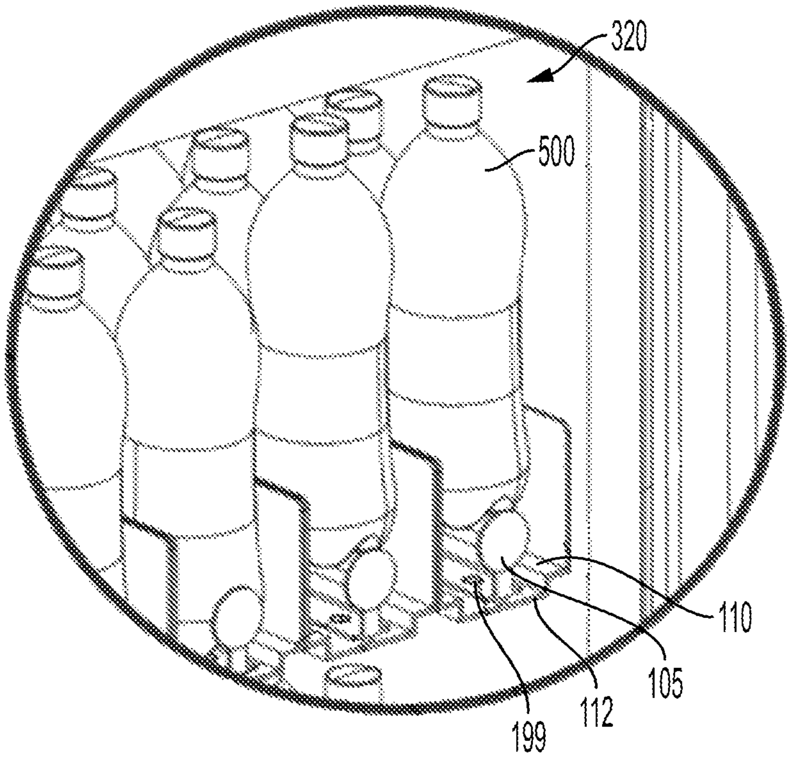
FIG. 17 shows a close-up perspective view of a platform having a sensor according to an embodiment.
Figure 18:
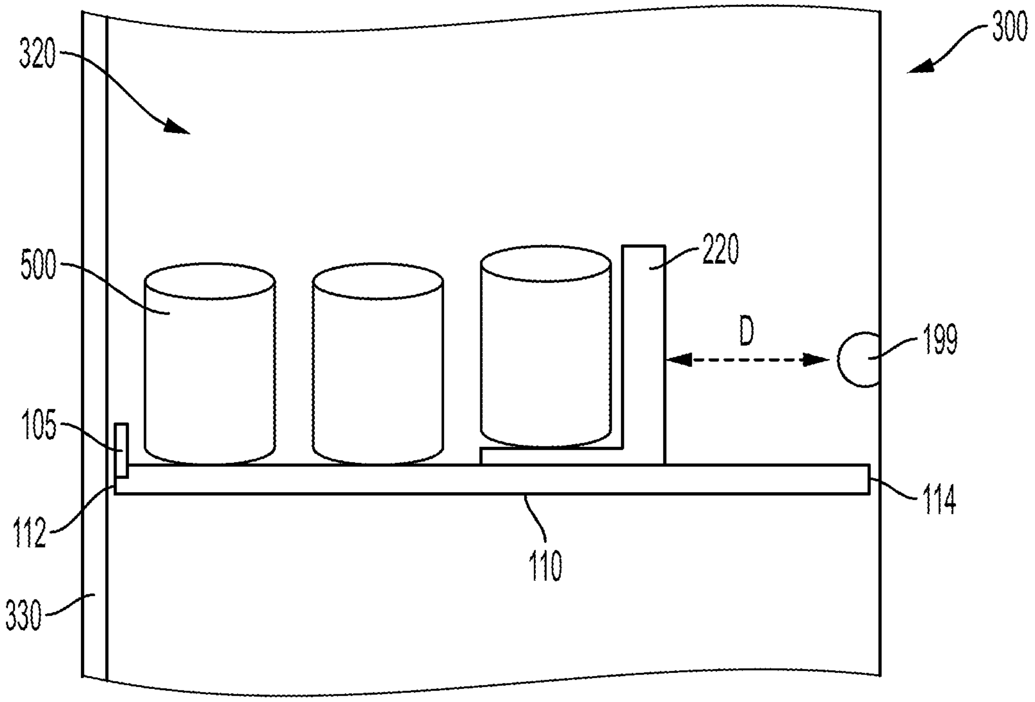
FIG. 18 shows a diagrammatic view of a vending machine having a distance sensor according to an embodiment.

Some embodiments described herein relate to a vending machine having a sensor for detecting removal of a product from the product compartment, as shown in FIGS. 17 and 18. Sensors may be used to detect removal of products to track product inventory and prevent theft of products. Information from sensors regarding the number of products removed may be used to update the vending machine inventory, to determine when restocking is needed, and to determine the total price to charge a consumer.

In such embodiments, vending machine 300 may include a housing 310 defining a product compartment 320 and a door 330 movably secured to housing 310. Product compartment 320 may include a platform 110 on which products are arranged from a first end 112 to an opposing rear end. Each platform 110 may include an advancing mechanism, such as a pusher, roller, or gravity feed. Further, each platform 110 may include a stopper 105 at first end 112 of platform 110 to prevent products from advancing off of platform 110. The consumer may manually retrieve the desired products when the door 330 of vending machine 300 is opened. Product compartment 320 may include a sensor configured to detect a product removed from platform 110. In this way, vending machine 300 may automatically track removal of products without concern of theft of products.

In some embodiments, sensor 199 may be arranged on platform 110 at a first end 112 of platform 110, as shown in FIG. 17. Product sensor 199 may be an infrared sensor, or a photosensor, among others. A product 500 at first end 112 of platform 110 may rest on product sensor 199, and product sensor 199 may detect when a product 500 is removed from the position on top of product sensor 199 to determine product removal. As products are automatically advanced from second end of platform 110 toward first end 112, a second product on platform 110 may move into position on top of product sensor 199 when a first product is removed.

In some embodiments, sensor 199 may be a distance sensor arranged at a second end 114 of each platform 110, as shown in FIG. 18. Distance sensor 199 may be arranged, for example, on an interior wall of product compartment 320 at second end 114 of platform 110. As a product is removed from a row of products on platform 110, the remaining products are advanced toward first end 112 of platform 110. Distance sensor 199 may detect the distance D of the advancing mechanism, such as a pusher 220, to distance sensor 199. In embodiments not having a pusher, distance sensor 199 may detect the distance of the rearmost product to distance sensor 199. When a product is removed, the remaining products advance toward first end 112 of platform 110, increasing the distance D. The change in distance D may be used to determine the number of products removed. When distance D is equal to a predetermined maximum distance, such as a distance at which pusher 220 is at the first end 112 of platform 110 and no products remain, vending machine 300 may send a signal to an operator to indicate that restocking is needed.

In some embodiments, an advancing mechanism 210 for automatically advancing products towards first end 112 of platform 110 may include a one-way advancing assembly that may move in a direction toward first end 112 of platform 110 but may not move in a direction toward second end 114 of platform 110. One-way advancing assembly may help to avoid interference with operation of sensors 199 and inaccurate product recognition, such as if a consumer attempts to return a product removed from platform 110.

Figure 19:
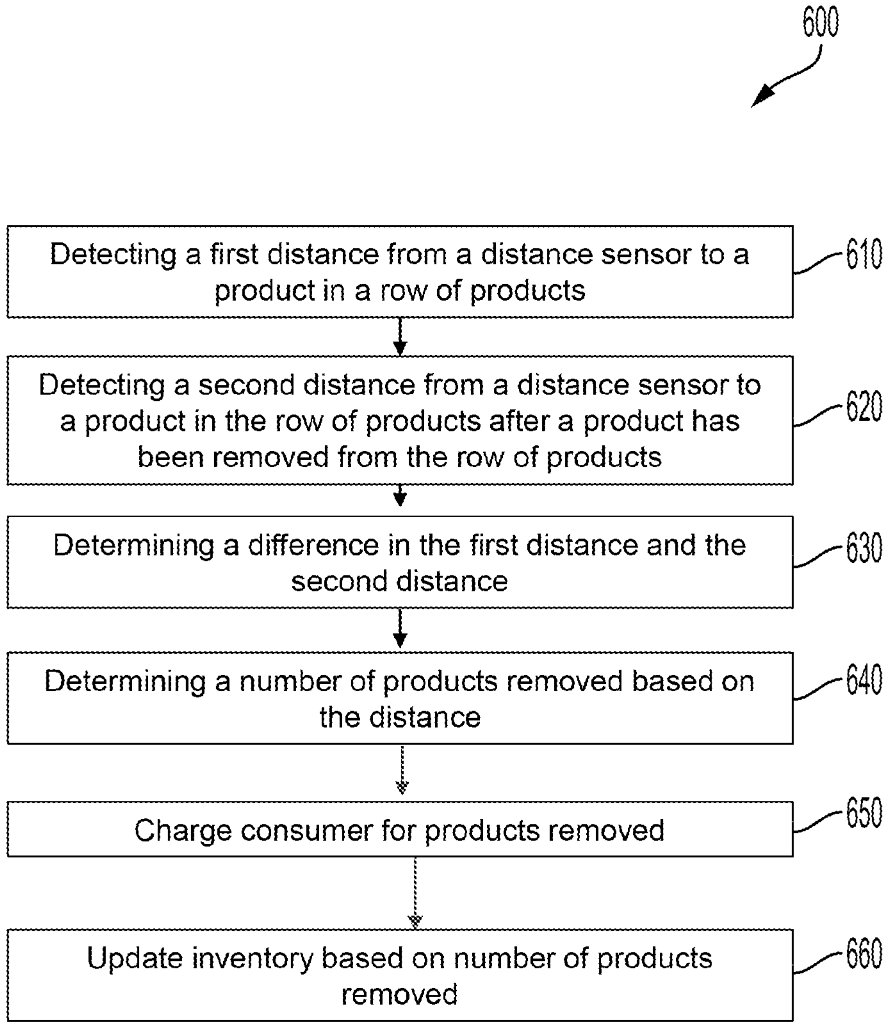
FIG. 19 shows an exemplary method of determining removal of products from a vending machine according to an embodiment.

An exemplary method of detecting removal of a product from a vending machine is shown in FIG. 19. The method may include detecting a first distance from a distance sensor to a product in a row of products 610. A second distance from the distance sensor to the product in the row of products may be detected after a consumer removes one or more products 620. A difference between the second distance and the first distance may be determined 630. A number of products removed may be determined based on the difference between the first distance and the second distance 640. A consumer may be charged for the products removed based on the determination of the number of products removed 650. An inventory may be updated based on the number of products removed 660.

Figure 20:
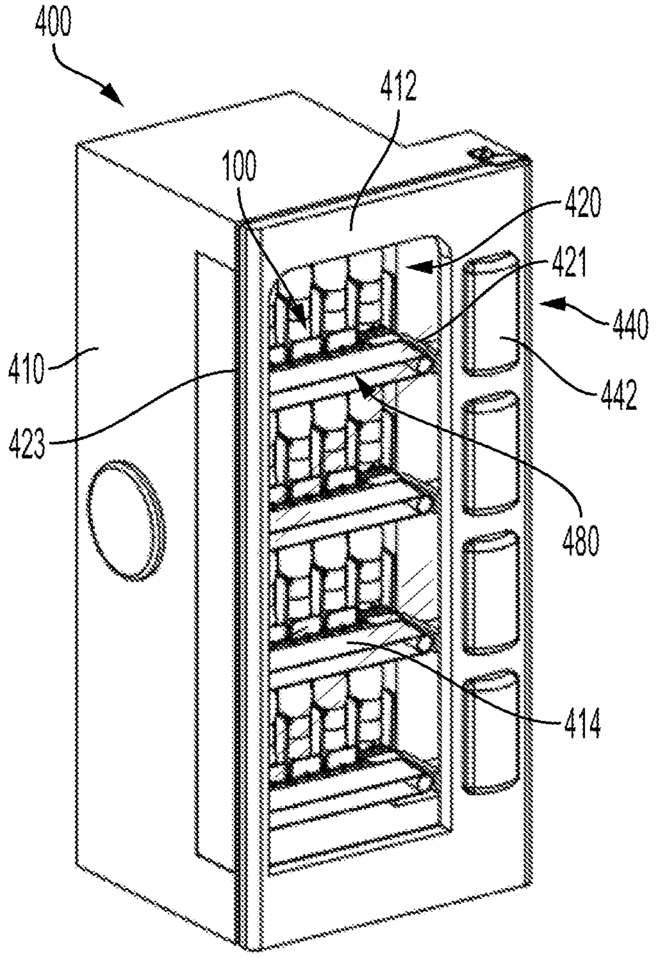
FIG. 20 shows a perspective view of a vending machine having a delivery mechanism according to an embodiment.

Some embodiments described herein relate to closed door vending machines 400 that include product compartments that are not directly accessible by a consumer. In FIG. 20, vending machine 400 includes a housing 410 defining a product compartment 420. Product compartment 420 is inaccessible to consumers using vending machine 400. Front wall 412 of housing 410 may include a transparent panel 414 to allow consumers to view product compartment 420 and products contained therein. Vending machine 400 may further include one or more product delivery bins or portals 440 for providing access to a dispensed product.

Products may be arranged on a platform of a product release mechanism 100 as described herein. In some embodiments, a plurality of product release mechanisms 100 are arranged within product compartment 420, such as on a shelf. A delivery mechanism 480 may be extend along first ends 112 of a plurality of platforms 110 and may extend from a first side 421 to an opposing second side 423 of product compartment 420. In FIG. 20, delivery mechanism 480 includes a conveyor assembly, as descried above with respect to FIG. 13. Rather than conveying a product to a product retrieval area 324 having a dispensing gate 190 as in FIG. 13, delivery mechanism 480 may convey the product to a delivery portal 440 arranged on housing 410 of vending machine 400. Delivery portal 440 may include a door 442 movably covering delivery portal 440 to provide a consumer with access to product within delivery portal 440.

Figure 21:
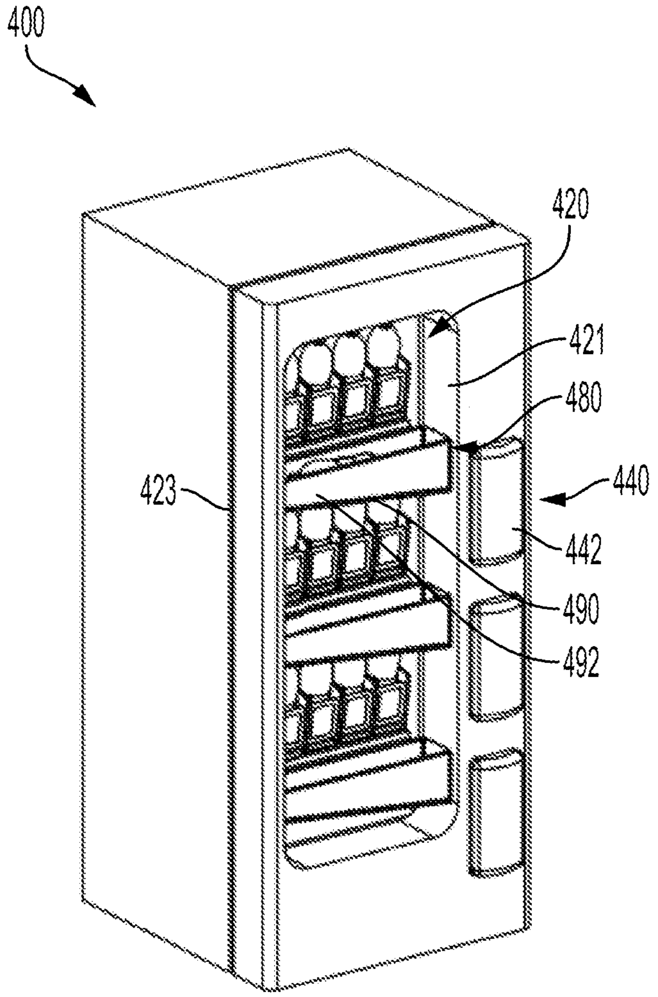
FIG. 21 shows a perspective view of a vending machine having a delivery mechanism according to an embodiment.

In some embodiments, delivery mechanism 480 may include a sloped surface 490 that directs a product toward a delivery portal 440, as shown in FIG. 21. Delivery portal 440 may be arranged on a side of housing 410. Sloped surface 490 may be arranged at an angle relative to a transverse plane, such as an angle of about 5 degrees to about 45 degrees, such that sloped surface 490 has a higher elevation at second side 423 than at first side 421 of product compartment 420. Sloped surface 490 may be planar to allow a product to move under the force of gravity along the sloped surface 490 to delivery portal 440. In some embodiments, sloped surface 490 may include rollers or bearings to facilitate movement of product toward delivery portal 440. Sloped surface 490 may include a sidewall 492 to prevent product from falling off of a side of the sloped surface 490. Sidewall 492 may be transparent so that the product may be viewed by the consumer throughout the dispensing process. Sloped surface 490 may be inexpensive and requires little to no maintenance due to no electrical components or moving parts. In some embodiments, each shelf may include a delivery mechanism 480 configured to convey a product dispensed from that shelf into a delivery portal 440.

Figure 22:
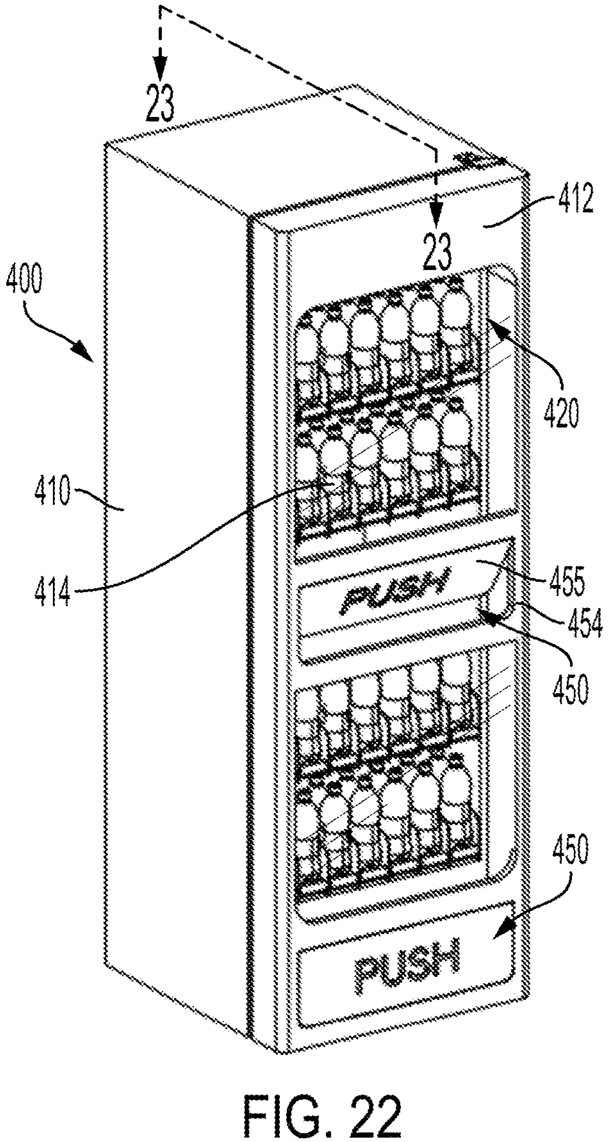
FIG. 22 shows a perspective view of a vending machine having delivery bins according to an embodiment.

In some embodiments, vending machine 400 may include one or more delivery bins 450, as shown in FIG. 22. Thus, vending machine 400 may be similar to vending machine 300 of FIGS. 16A and 16B, except vending machine 400 does not include an openable door. Vending machine 400 includes a housing 410 defining a product compartment 420 for storing products. Housing 410 includes a front wall 412 having a transparent panel 414 configured to allow a consumer to view product compartment 420 of vending machine 400. Products may be stored in product compartment 420 on a shelf or platform. A product release mechanism 100 as described herein may be arranged in product compartment 420 so as to selectively control release of a product from a platform 110 to a delivery bin 450 for access by a consumer. Product release mechanism 100 may include a platform 110 having a first end 112 opposite a second end 114, and a gate arranged at first end 112 configured to move from a closed configuration in which products are retained on platform 110 to an open position in which a product may fall off of first end 112 of platform 110. Products may advance along platform 110 of product release mechanism 100 under a force of gravity due to an incline of platform 110 or product release mechanism 100 may include an advancing assembly configured to automatically advance products toward first end 112 of platform 110.

In some embodiments, delivery bin 450 may be arranged at first end 112 of one or more platforms 110 such that a product released from platform 110 may fall under the force of gravity into delivery bin 450. Delivery bin 450 may extend between opposing sides of product compartment 420 such that delivery bin 450 is configured to receive a product from any of various product release mechanisms 100. Delivery bin 450 may have a body 451 defining an open upper end that is arranged at or below first end 112 of platform 110 so that product may fall into delivery bin 450 via the open upper end. Delivery bin 450 may be arranged along front wall 412 of housing 410 of vending machine 400 and may be integrally formed with front wall 412. Front wall 412 may define an opening 454 of delivery bin 450 through which a consumer may access a product in delivery bin 450.

Figure 23:
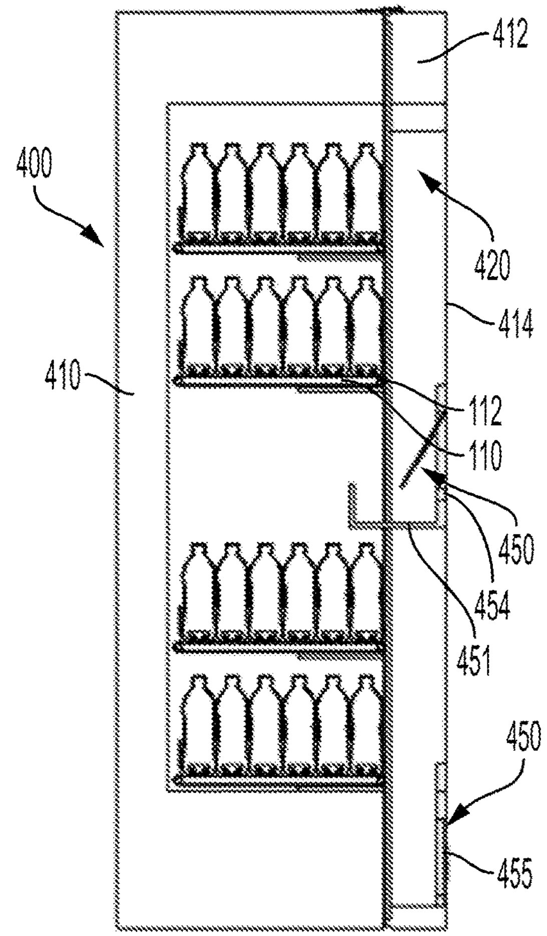
FIG. 23 shows a longitudinal cross sectional view of the vending machine of FIG. 22 as taken along line 23-23 in FIG. 22.

In some embodiment, delivery bin 450 may include a flap 455 movably covering opening 454, as shown in FIGS. 22 and 23. Flap 455 may be movably connected to front wall 412 or to body 451 of delivery bin 450. Flap 455 may rotate into delivery bin 450 when a consumer retrieves a product such that flap 455 helps to prevent a consumer from reaching into product compartment 420. In some embodiments, each shelf of vending machine 400 may have an associated delivery bin 450, such that when a product is released from a shelf, the product falls into the delivery bin 450 for that shelf. In some embodiments, one delivery bin 450 may be associated with two or more shelves as shown in FIGS. 22 and 23. For example, vending machine 400 may include four shelves, and two delivery bins 450. This may help to conserve space in product compartment 420 relative to a vending machine 400 having additional delivery bins 450 while helping to reduce a distance that each product falls to reach delivery bin 450. In some embodiments, vending machine 400 may include a single delivery bin 450 arranged at a lower end of product compartment 420 to receive a product released from any shelf. The use of one delivery bin 450 may reduce the cost of manufacturing vending machine 400 and may conserve space within product compartment 420.

Figure 24:
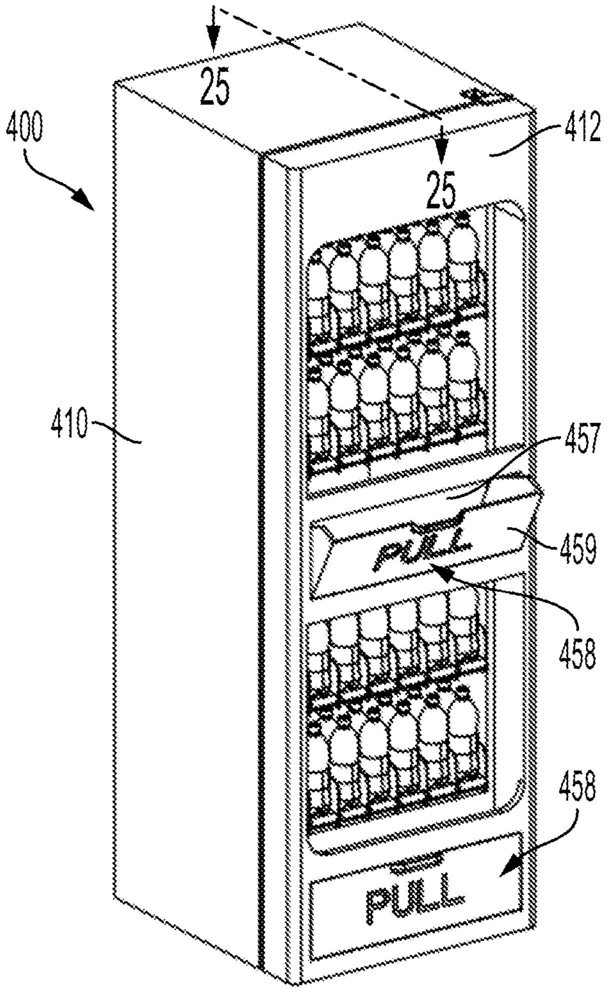
FIG. 24 shows a perspective view of a vending machine having delivery bins according to an embodiment.
Figure 25:
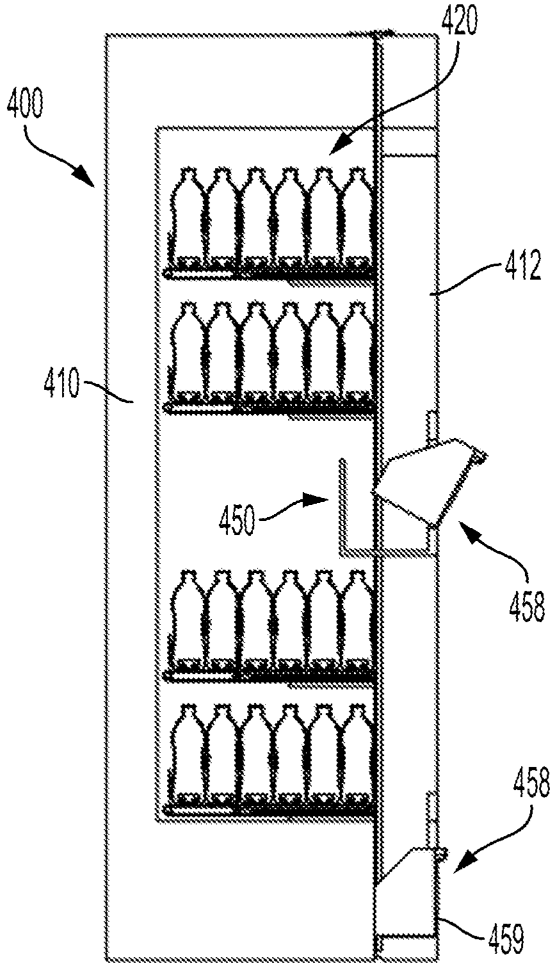
FIG. 25 shows a longitudinal cross sectional view of the vending machine of FIG. 24 as taken along line 25-25 in FIG. 24.

In some embodiments, delivery bin 450 may include a drawer 458 as shown for example in FIGS. 24 and 25. Rather than a flap 455 as shown in FIGS. 22 and 23, drawer 458 is movably connected to delivery bin 450 from a closed configuration in which a front wall 459 of drawer 458 is aligned with front wall 412 of housing 410, and drawer 458 may pivot or rotate outwardly to provide a consumer with access to a product held within drawer 458. When drawer 458 is in the open configuration, a rear wall 457 of drawer 458 may help to block the opening of front wall 412 of vending machine 400 to prevent a consumer from accessing product compartment 420.

Some embodiments described herein relate to vending machine 400 having a buffering mechanism 460 configured to control or slow a fall of a product in vending machine 400. Vending machine 400 may include one or more delivery bins 450 and may include a delivery bin 450 arranged at a lower end of product compartment 420. Product compartment 420 may include a plurality of product release mechanisms 100 as described herein, and may include a space between a first end 112 of platforms 110 of product release mechanisms 100 and front wall 412 of housing 410 to provide room for a product to fall to delivery bin 450. In this way, when a product is released from a platform 110, the product may fall under the force of gravity into delivery bin 450 and may be retrieved by a consumer through a front opening 454 of delivery bin 450. Products falling from platforms 110 that are located toward an upper end of product compartment 420 fall a greater distance to reach delivery bin 450 and as a result may be damaged, broken, or shaken by the fall. In order to control the gravitational fall of the product, and to reduce the speed of the product, vending machine 400 may include one or more buffering mechanisms 460.

Figure 26:
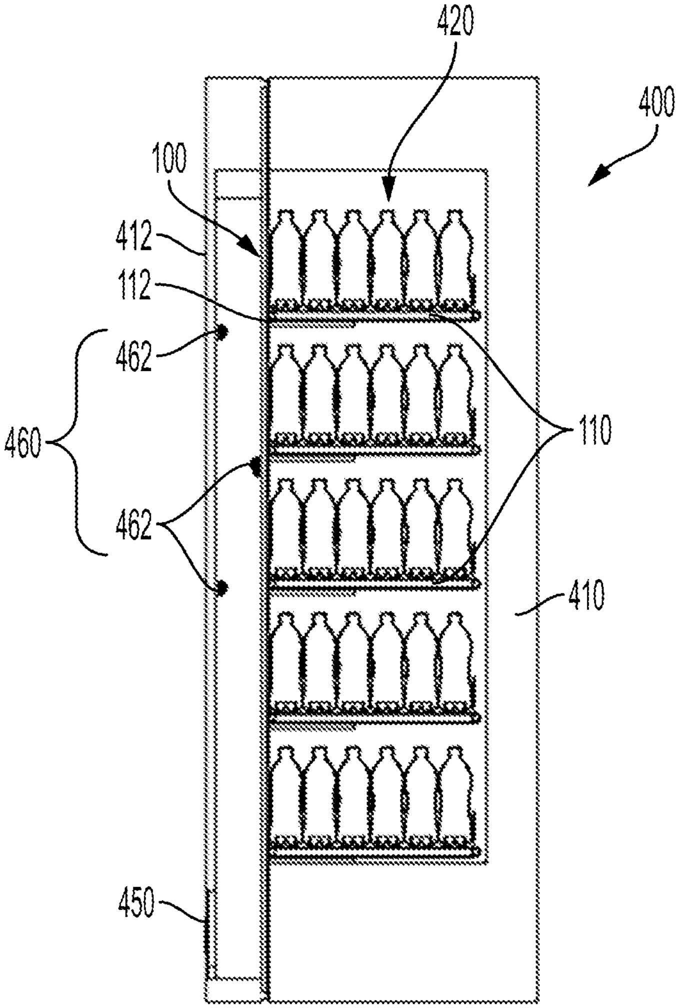
FIG. 26 shows a longitudinal cross sectional view of a vending machine having a buffering mechanism that includes pads according to an embodiment.

In some embodiments, as shown in FIG. 26, buffering mechanism 460 may include one or more pads 462. Pad 462 may be configured to break the fall of the product toward delivery bin 450. Each pad 462 may be composed of a soft material, such as a foam or rubber to provide cushioning for the product as it falls. In some embodiments, each pad 462 may extend from a first side of product compartment 420 to or toward an opposing second side of product compartment in a transverse direction of housing 410. Pad 462 may have a semi-circular cross sectional area as shown for example in FIG. 26. However, in alternate embodiments, pad 462 may have alternate cross sectional areas, such as a triangular cross sectional area.

Pads 462 may be arranged at a first end 112 of platforms 110, pads 462 may be arranged on front wall 412 of housing 410, or both. In some embodiments, buffering mechanism 460 may include a plurality of pads 462 spaced from one another between upper end and lower end of product compartment 420. In such embodiments, pads 462 may alternate locations on front wall 412 and first end 112 of platforms 110, as shown in FIG. 26. This may help to ensure product contacts one or more pads 462 as it falls.

Figure 27:
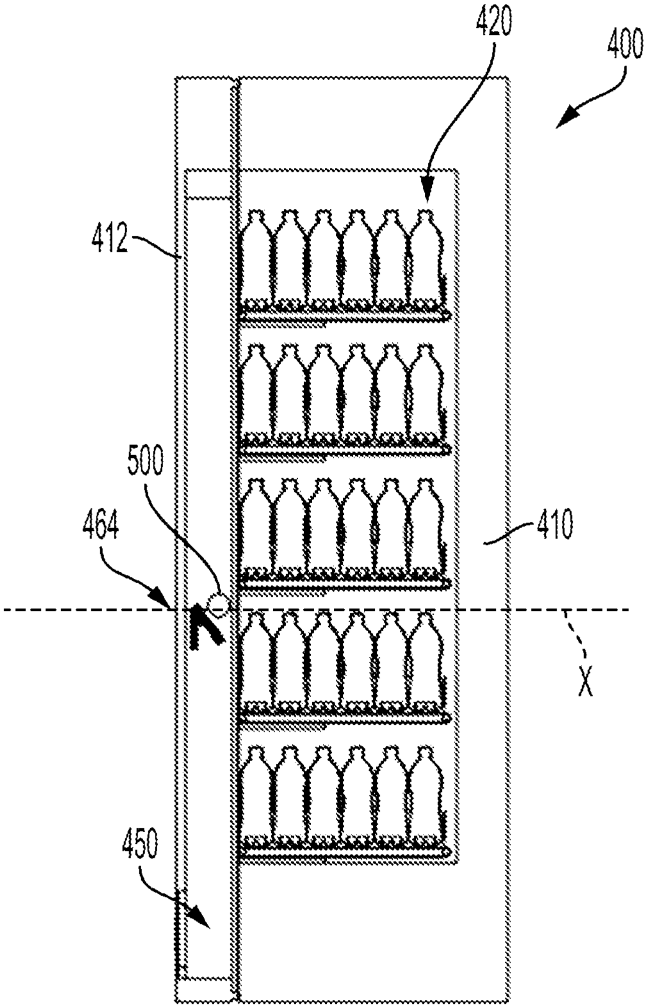
FIG. 27 shows a longitudinal cross sectional view of a vending machine having a buffering mechanism that includes a flap according to an embodiment.

In some embodiments, buffering mechanism 460 may include a flap 464 movable from a closed position to an open position, as shown in FIG. 27. Flap 464 may be connected to a front wall 412 of housing 410 and may extend toward first end 112 of platforms 110. In the closed position, flap 464 may be arranged along a transverse axis X of vending machine 400. Flap 464 may be biased in the closed position. Flap 464 may be movable to an open position in which flap 464 is arranged generally parallel to a plane of front wall 412 of housing 410 and a closed position in which flap 464 is transverse to a plane of front wall 412 of cabinet. Flap 464 may be biased in the closed position by a biasing mechanism, such as a spring, among others. Flap 464 may include a cushion or pad to provide a soft landing for product as it contacts flap 464.

Figure 28:
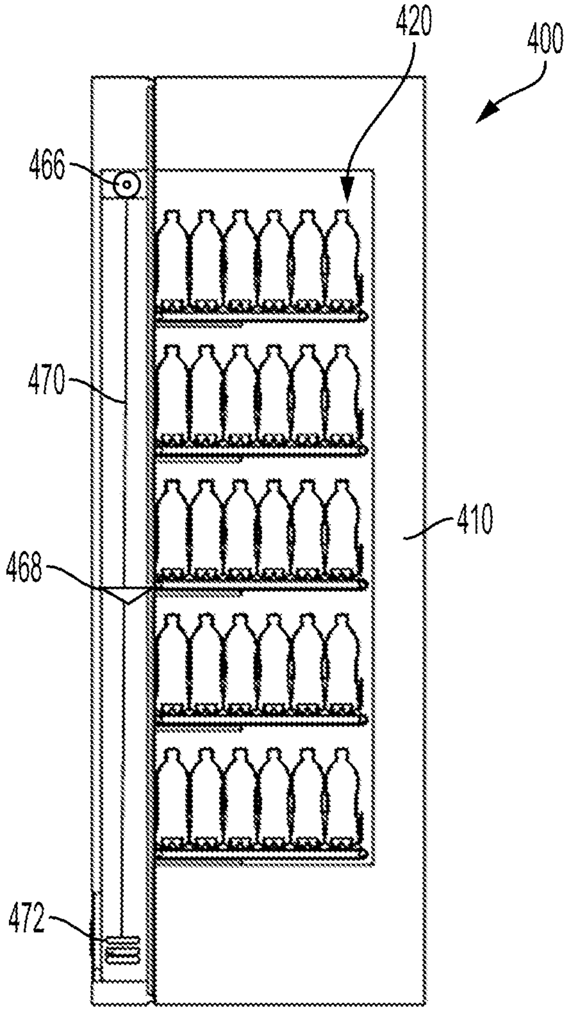
FIG. 28 shows a longitudinal cross sectional view of a vending machine having a buffering mechanism that includes a receiver according to an embodiment.

In some embodiments, buffering mechanism 460 may include a pulley 466, as shown for example in FIG. 28. A receiver 468 may be arranged in front of platforms 110 so as to receive a product thereon. A cable 470 may be arranged around a pulley 466 and connected at a first end to receiver 468 and connected at a second end to a counterweight 472. As product falls from a platform 110 onto receiver 468, receiver 468 may lower the product to the delivery bin 450 balanced by counterweight 472 to reduce the speed at which the product moves to delivery bin 450.

Figure 29:
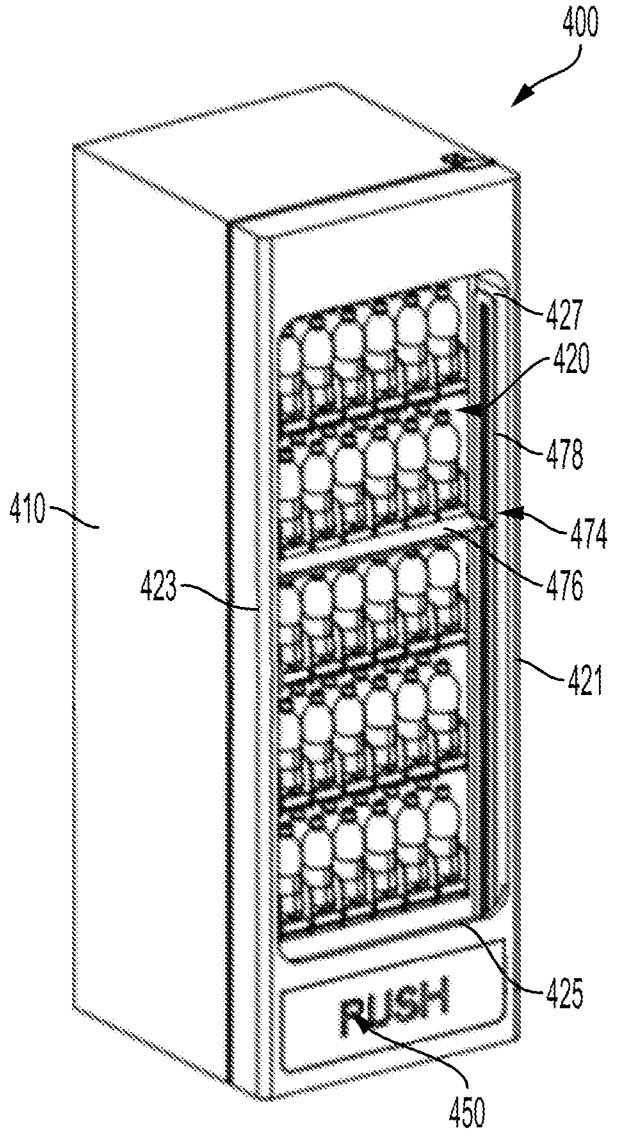
FIG. 29 shows a perspective view of a vending machine having a buffering mechanism that includes a Y-mechanism according to an embodiment.

In some embodiments, buffering mechanism 460 may include a Y-mechanism 474, as shown for example in FIG. 29. Y-mechanism 474 may include a receiver 476 movable along a tracks 478. Receiver 476 may have a V-shape to receive and hold a product. In some embodiments, receiver 476 may have a U-shape, among other configurations. A pair of tracks 478 may be arranged on opposing sides 421, 423 of product compartment 420 and may extend from lower end 425 toward upper end 427 of product compartment 420. Opposing ends of receiver 476 may include pinions that engage with teeth of tracks 478. However, in some embodiments, receiver 476 may be movable along tracks, or may be lifted by a pulley and cable system. Receiver 476 may be automatically movable along tracks 478, such as by a motor. When a product has been selected for dispensing, Y-mechanism 474 may move receiver 476 to the location of the shelf containing the product to be dispensed so that the product falls a short distance into receiver 476. Y-mechanism 474 may then move receiver 476 containing the dispensed product to the delivery bin 450 for access by a consumer.

Figure 30:
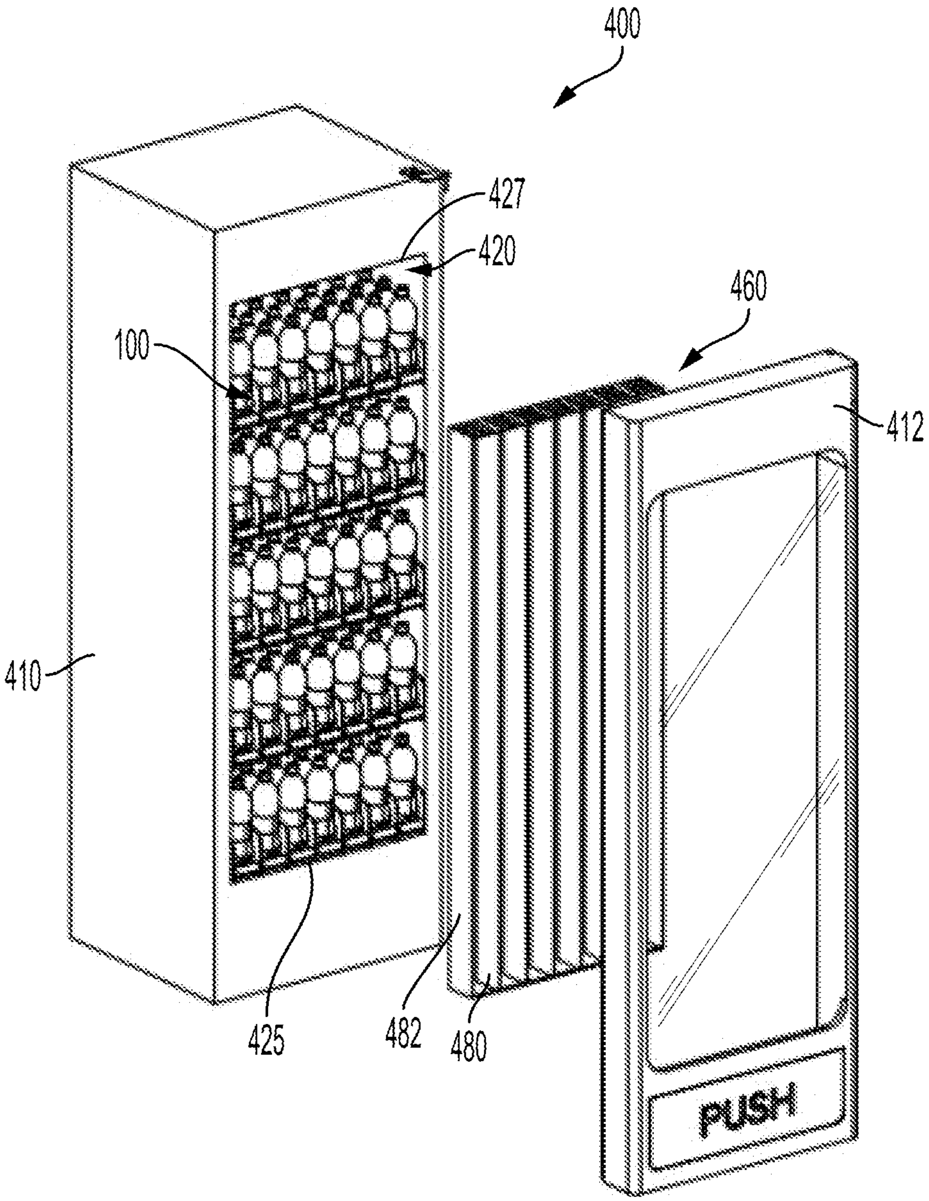
FIG. 30 shows an exploded view of a vending machine having a buffering mechanism that includes guide channels according to an embodiment.

In some embodiments, buffering mechanism 460 may include guide channels 480 defined by vertical walls 482, as shown in FIG. 30. A pair of vertical walls 482 may define a channel 480 such that when a product is released from a product release mechanism 100, movement of product is constrained by channels 480. Channels 480 may help to ensure products move only in a vertical direction and does not spin or move laterally across product compartment 420 when falling. In some embodiments, channels 480 may have a width that is similar to a width of the product such that channel 480 defines a narrow passage through which product travels which may result in slowing the fall of the product. Channels 480 may extend from upper end 427 of product compartment 420 to or toward lower end 425. In some embodiments, a lower end of each wall 482 may have a bend or curvature and may include a cushion or pad.

Figure 31:
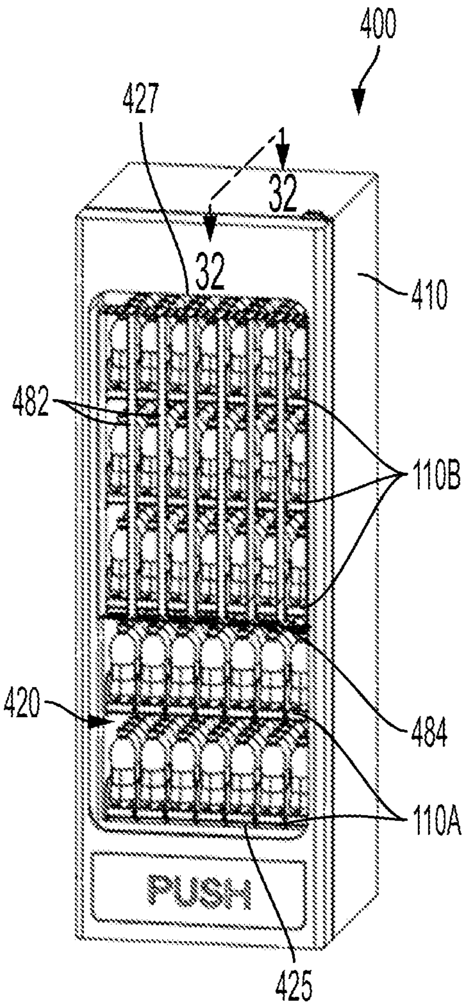
FIG. 31 shows a front perspective view of a vending machine having a buffering mechanism that includes bristles according to an embodiment.
Figure 32:
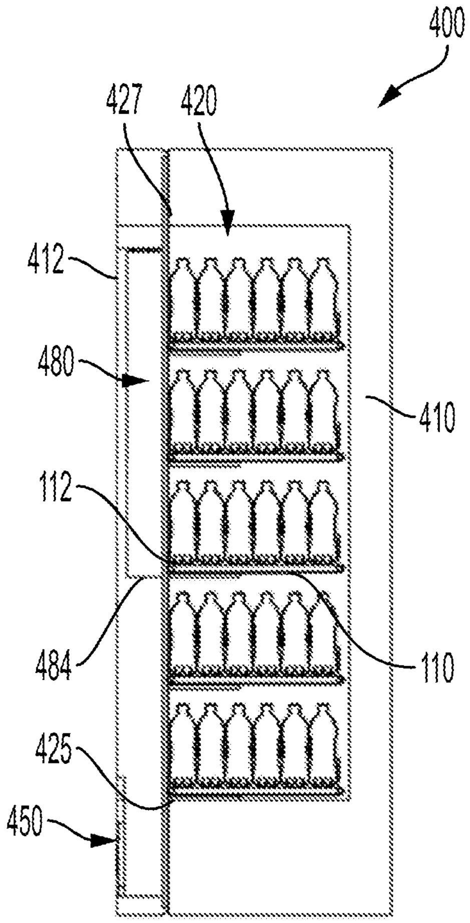
FIG. 32 shows a longitudinal cross sectional view of the vending machine of FIG. 31 as taken along line 32-32 in FIG. 31.

In some embodiments, buffering mechanism 460 may include a plurality of bristles 484, as shown in FIGS. 31 and 32. Bristles 484 may extend from a front wall 412 to or toward first end 112 of platforms 110. Bristles 484 may be flexible so as to bend or flex when contacted by a product. In this way, as a product falls from a platform 110 under the force of gravity toward delivery bin 450, bristles 484 may slow the fall of the product to prevent damage to the product or shaking of carbonated beverages. In some embodiments, vending machine 400 may include a combination of buffering mechanisms as described herein. For example, FIGS. 31 and 32 show a combination of guide channels 480 and bristles 484. Bristles 484 may be secured to guide channels 480 and may be arranged at various locations within guide channels 480. Further, as shown in FIG. 31, channels may not extend entirely to lower end of product compartment 420. Products on platforms 110A adjacent lower end 425 may fall a shorter distance relative to products on upper platforms 110B and may not require buffering mechanisms 460 to break their fall due to the short distance traveled.

Figure 33:
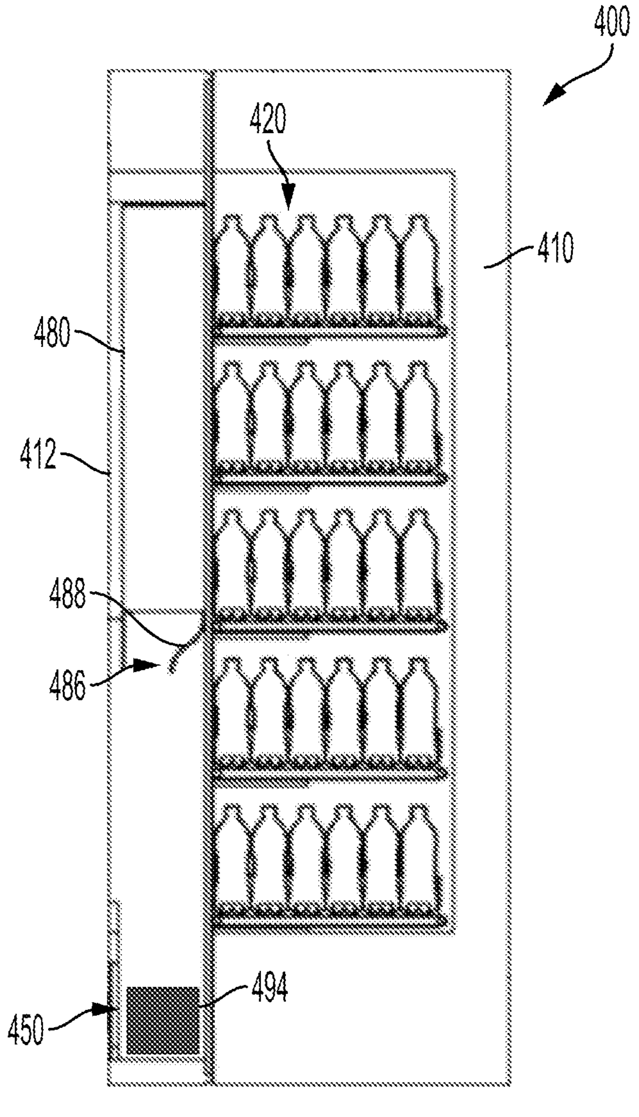
FIG. 33 shows a longitudinal cross sectional view of a vending machine having a buffering mechanism that includes a constriction and additionally a cushion according to an embodiment.

In some embodiments, buffering mechanism 460 may include a constriction 486, as shown in FIG. 33. Constriction 486 may be a narrow passageway configured to slow a fall of a product from a platform 110 to delivery bin 450. Constriction 486 may be defined by one or more panels 488 extending from platforms 110 toward front wall 412 of housing 410, or extending from front wall 412 of housing 410 toward platforms 110. As a product falls from a platform 110, product may fall freely until reaching constriction 486 and may be deflected by panel 488 through constriction 486. In some embodiments, constriction 486 may be arranged at a lower end of a guide channel 480, such that a product falls through a guide channel 480 and is then deflected through constriction 486 to control and slow a fall of a product toward delivery bin 450.

In some embodiments, vending machine 400 may include a cushion 494 arranged in delivery bin 450, as shown in FIG.

33. Cushion 494 may soften the impact of the product with delivery bin 450 to minimize damage or breakage of a product. Cushion 494 may include a soft material, such as a foam, among others, that may absorb the impact of the product.

Vending machine 400 may include a combination of buffering mechanism 460 as described herein. In some embodiments, vending machine 400 may include one or more of guide channels 480, a constriction 486, pads 462, flaps 464, bristles 484, and a cushion 494.

In any of the various embodiments described herein, a vending machine may include a cooling unit configured to maintain the product compartment or a portion thereof at a predetermined temperature, such as may be necessary for providing the stored products at a desired temperature for consumption, for storing perishable products, or for extending shelf-life of the stored products. The cooling unit may be a vapor-compression refrigeration unit, a thermoelectric cooling unit, or a cold plate, among other cooling units. In some embodiments, a product compartment of the vending machine may be maintained at ambient temperature, such as when vending machine is used to store retail merchandise.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A vending machine, comprising:

a housing defining a product compartment, wherein the housing comprises a front wall having a transparent portion;

a first product release mechanism, comprising:

a platform arranged within the product compartment for storing a product, wherein the platform comprises a first end opposite a second end; and a first gate arranged on the platform and movable from a closed position to an open position to release the product from the platform;

a first delivery bin having an open front end, wherein the first delivery bin is arranged at the first end of the platform such that when the first gate is moved to the open position, the product falls under a force of gravity from the platform into the first delivery bin for access by a consumer through the open front end of the first delivery bin;

a second product release mechanism arranged within the product compartment for storing a second product, wherein the second product release mechanism is arranged at a different elevation than the first product release mechanism; and a second delivery bin arranged at a different elevation than the first delivery bin, wherein the second delivery bin is configured to receive the second product that falls under a force of gravity from the second product release mechanism into the second delivery bin for access by the consumer through an open front end of the second delivery bin.

2. The vending machine of claim 1, wherein the product is a beverage container, and wherein the platform is configured to support the beverage container in an upright orientation.

3. The vending machine of claim 1, wherein the platform is arranged at an incline such that the product moves from the second end of the platform toward the first end of the platform under a force of gravity.

4. The vending machine of claim 1, further comprising an advancing mechanism configured to automatically advance the product toward the first end of the platform.

5. The vending machine of claim 1, wherein the platform is one of a plurality of platforms arranged at different elevations within the product compartment, and wherein the first delivery bin is one of a plurality of delivery bins.

6. The vending machine of claim 1, wherein the first delivery bin further comprises a flap that movably covers the open front end of the first delivery bin.

7. The vending machine of claim 1, wherein the first delivery bin comprises a drawer that is movable from a closed position to an open position such that a product within the drawer is accessible to a consumer in the open position.

8. The vending machine of claim 1, wherein the first product release mechanism further comprises a gate control mechanism configured to selectively control movement of the first gate from the closed position to the open position.

9. The vending machine of claim 8, wherein the gate control mechanism comprises a rack engaged with a pinion of the first gate.

10. A vending machine, comprising:

a housing defining a product compartment, wherein the housing comprises a front wall having a transparent portion;

a platform arranged within the product compartment for storing a product, wherein the platform comprises a first end opposite a second end;

a product release mechanism configured to selectively release the product from the platform;

a delivery bin arranged below the platform such that when the product release mechanism is operated, the product falls from the platform into the delivery bin for access by a consumer; and a buffering mechanism disposed on the front wall of the housing and configured to control the fall of the product from the platform into the delivery bin.

11. The vending machine of claim 10, wherein the product release mechanism comprises a gate and a gate control mechanism configured to move the gate from a closed position to an open position.

12. The vending machine of claim 10, wherein the buffering mechanism comprises a guide channel extending from an upper end of the product compartment toward a lower end of the product compartment, wherein the delivery bin is arranged below the platform.

13. The vending machine of claim 10, wherein the buffering mechanism comprises a cushion.

14. The vending machine of claim 10, wherein the buffering mechanism comprises a plurality of bristles extending transverse to a longitudinal axis of the housing.

15. The vending machine of claim 10, wherein the buffering mechanism comprises one or more pads arranged on the front wall of the housing or on the first end of the platform.

16. A product release mechanism for a vending machine, comprising:

a platform having a first end opposite a second end and configured to support a first product and a second product;

a first gate arranged at the first end of the platform and movable from a closed position in which the first product is not accessible to a consumer to an open position in which the first product is accessible to a consumers;

a first rail extending from the first end of the platform to the second end of the platform along a first side of the platform;

a second rail extending from the first end of the platform to the second end of the platform along a second side of the platform opposite the first side;

a second gate arranged on the platform and spaced from the first gate and movable from a closed position to an open position, wherein the second gate is configured to extend from the first rail to the second rail to prevent access to the second product; and a gate control mechanism configured to control the first gate and the second gate, such that the first gate is arranged in the open position and the second gate is moved to the closed position to provide a consumer with access to the first product on the platform while preventing access to the second product on the platform.

17. The product release mechanism of claim 16, further comprising an advancing assembly configured to automatically advance the first product and the second product toward the first end of the platform.

18. The product release mechanism of claim 16, further comprising a third gate spaced from the second gate and configured to control an advance of products on the platform toward the first end of the platform.

19. The product release mechanism of claim 16, further comprising a gate control mechanism configured to control opening and closing of the first gate and the second gate.

* * * * *